United States Patent Office 3,488,454
Patented Jan. 6, 1970

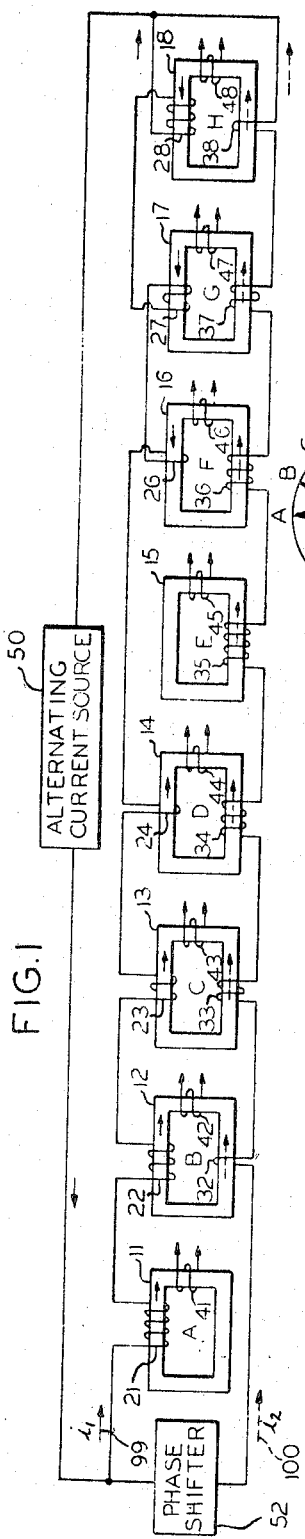

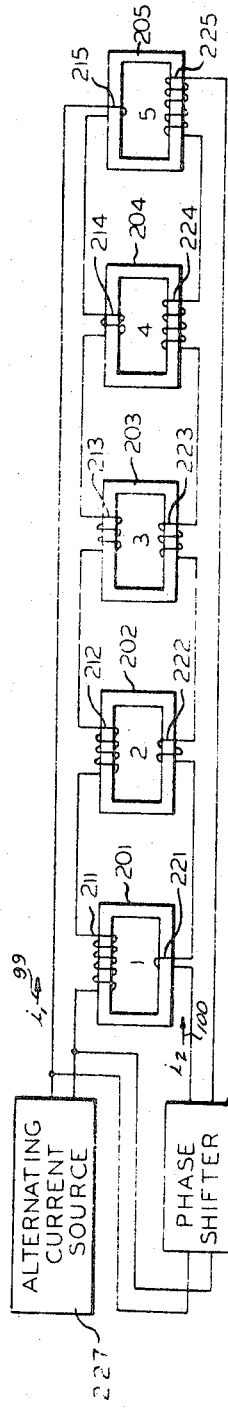
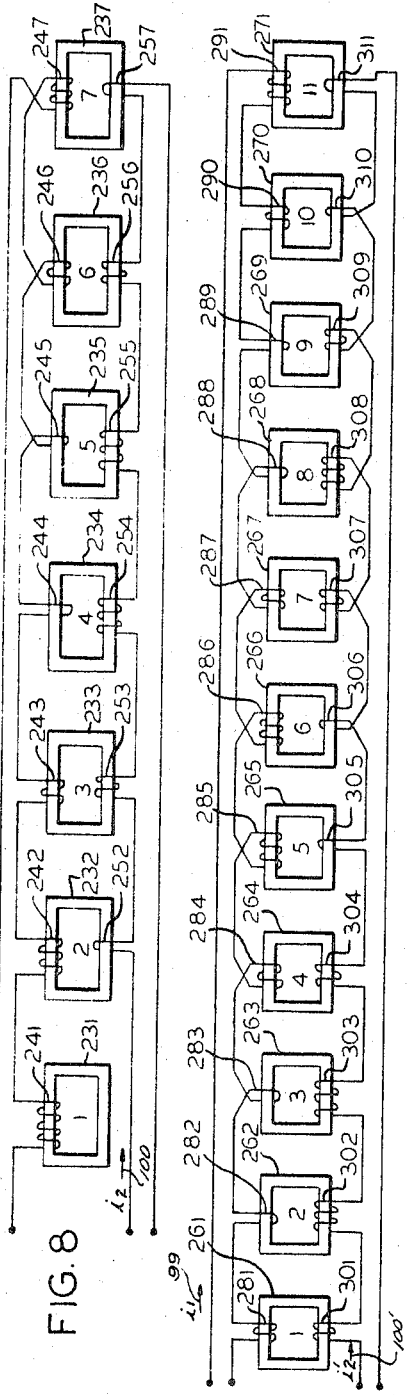
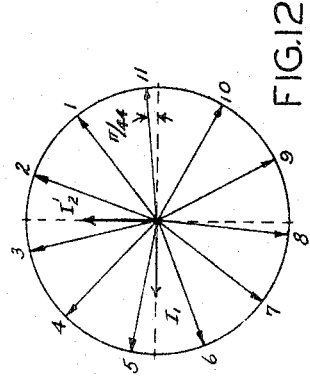
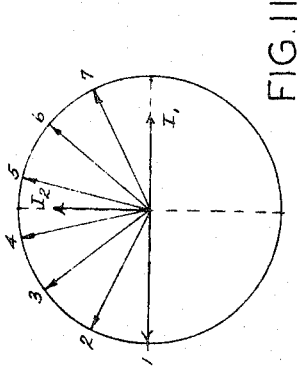
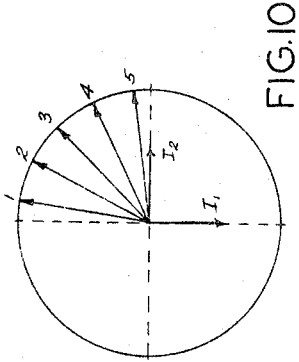
INVENTOR.
MARVIN CAMRAS

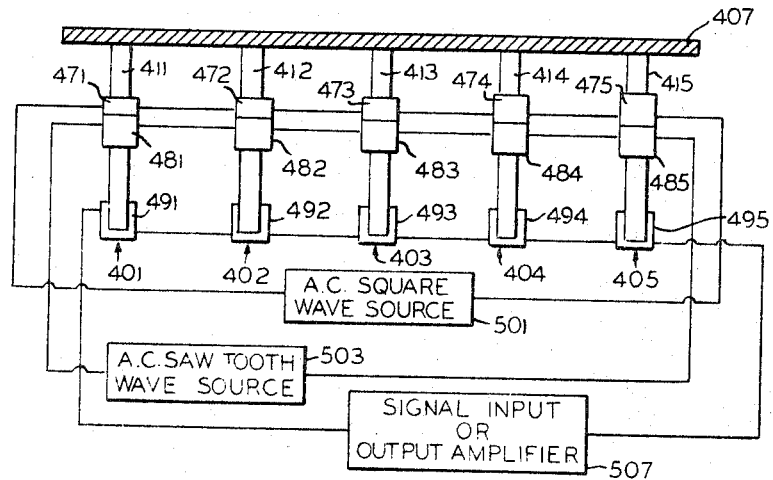
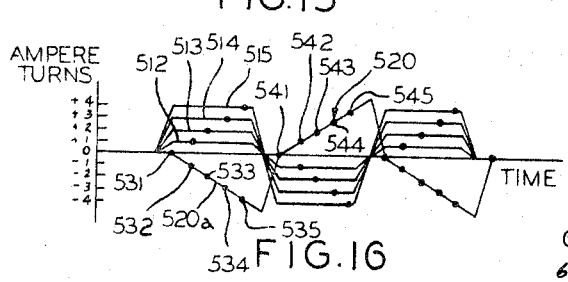
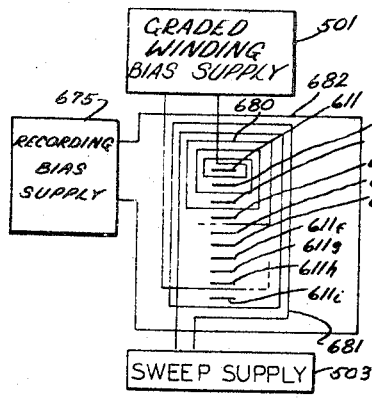
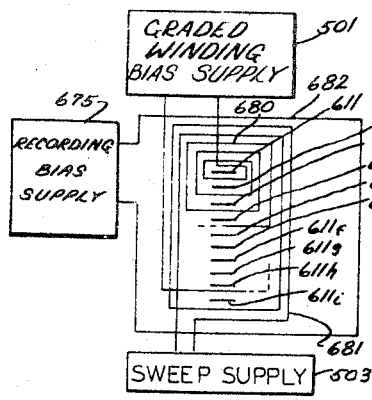

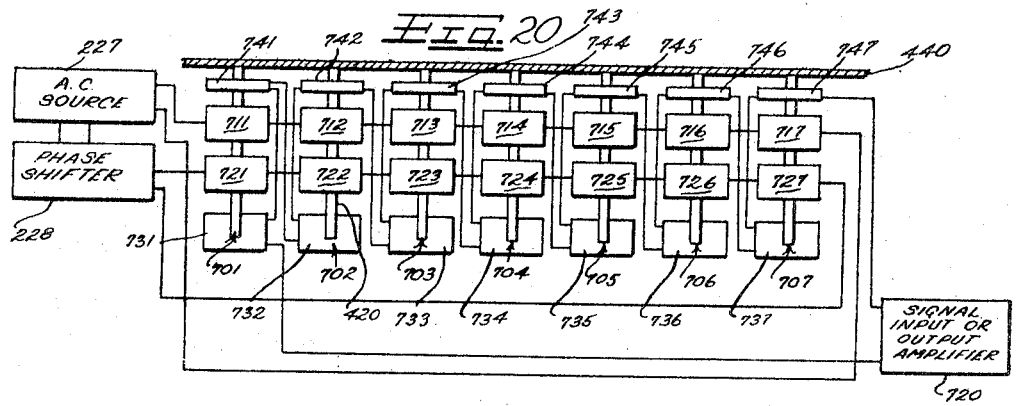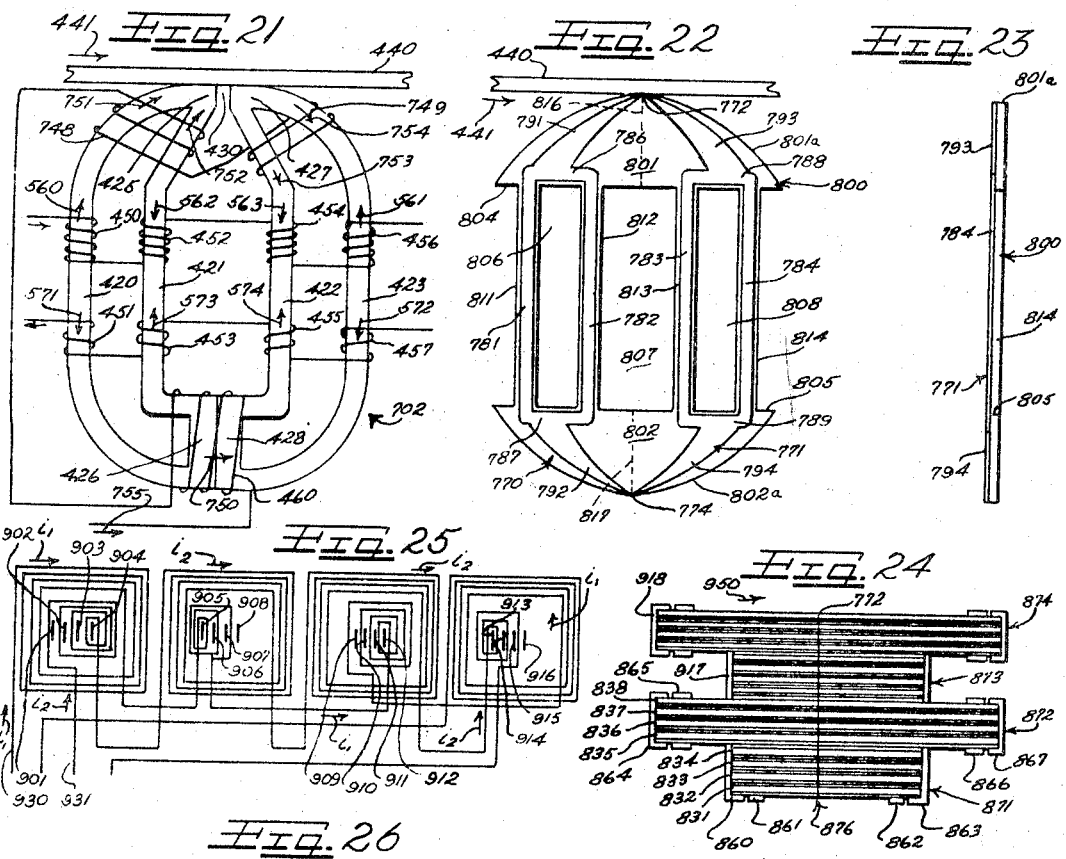

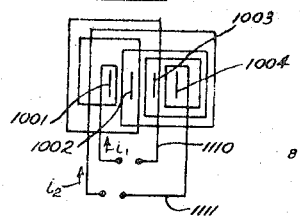 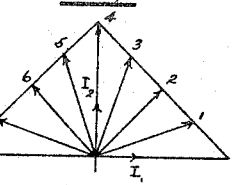 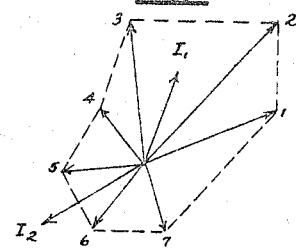 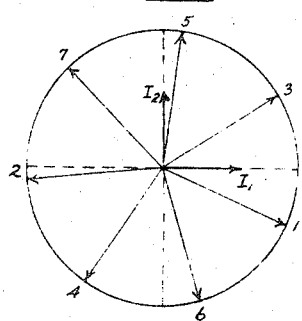

3,488,454
TRANSDUCER SYSTEM HAVING A SERIES OF CORES WITH FIRST AND SECOND WINDINGS WITH A.C. SIGNALS APPLIED THERETO
Marvin Camras, Glencoe, Ill., assignor to IIT Research Institute, a corporation of Illinois
Original application Aug. 5, 1960, Ser. No. 47,741. Divided and this application Oct. 13, 1965, Ser. No. 515,507
Int. Cl. G11b 5/00
U.S. Cl. 179—100.2
33 Claims

ABSTRACT OF THE DISCLOSURE

A magnetic transducer system for recording and playback of television or other video frequency signals on magnetic record media wherein a series of head units are sequentially switched by means of alternating polarity magnetomotive force waveforms such as out of phase sine waveforms applied to respective series of graded windings linking the successive head units with successively different numbers of turns, recording head arrangement utilizing a magnetic core of ring configuration and larger non-magnetic gap at the inactive side of a tape record medium, and a stacked magnetic core transducer system and a single conductor linking successive cores with successive numbers of turns.

---

The present application is a division of my application Ser. No. 47,741 filed Aug. 5, 1960, now abandoned.

This invention relates to a magnetic transducer system capable of recording and playback of television or other video frequency signals on magnetic record media.

Generally, the transducer system comprises a series of magnetic cores having one or more series of graded windings thereon. Particularly advantageous results are obtained where a plurality of series of graded windings are excited by respective phases of a multiphase alternating current source. Such an arrangement of cores and graded windings may be utilized as a recording or playback head for magnetic record media which does not require any moving parts or electric valve components. The operating frequency of the system of the present invention is limited only by core materials and may be of the order of a megacycle for metal cores and of the order of many megacycles where ferrite cores are used. Magnetic recording of video signals represents an application of the present invention which is of major importance.

It is therefore an important object of the present invention to provide a novel transducer system utilizing a series of magnetic cores and capable of transducing video signals without requiring moving parts or electric valve components.

Another object of the invention is to provide a novel magnetic transducer head for magnetic record media.

Other objects, features and advantages of the present invention will be apparent from the following detailed description taken in connection with the accompanying drawings, in which:

FIG. 1 is a diagrammatic illustration of a preferred form of transducer system in accordance with the present invention utilizing two series of graded windings and respective sinusoidal excitting currents which are 90° out of phase;

FIG. 2 illustrates the waveform of the respective out of phase exciting currents for the graded windings of FIG. 1;

FIG. 3 illustrates in a composite diagrammatic view the general nature of the variation in the derivative of magnetic flux with respect to time in the series of cores shown in FIG. 1 on the time scale of FIG. 2;

FIG. 4 is a diagrammatic illustration of the magnetizing forces produced by the graded windings on the respective magnetic cores in the embodiment of FIG. 1 on the time scale of FIG. 2;

FIG. 5 is a plot of intrinsic flux density as a function of magnetizing force for the magnetic material forming the cores shown in FIG. 1;

FIG. 5A is a vector diagram indicating the variation of net magnetizing forces in the respective cores as a function of time;

FIG. 6 is a diagrammatic longitudinal sectional view of the series of cores of FIG. 1 arranged in stacked relation and illustrating a preferred manner of winding the cores where the windings are to have successive integral numbers of turns;

FIG. 7 illustrates a magnetic transducer system utilizing five magnetic cores and two series of oppositely graded windings wherein the successive cores are successively switched from a saturated condition of one polarity to a saturated condition of opposite polarity in alternate quarter cycles of the applied excitation currents;

FIG. 8 illustrates a transducer system wherein a series of seven cores are successively switched from one polarity of saturation to the other in each half cycle of the applied excitation currents;

FIG. 9 illustrates a transducer system utilizing eleven cores and having more complex series of graded windings to provide a switching sequence alternately from positive to negative polarity saturation and from negative to positive polarity saturation uniformly throughout the cycle of the applied excitation currents;

FIG. 10 is a vector diagram which may be utilized in computing the relative numbers of turns required for the windings on the successive cores of FIG. 7 to provide sequential switching of the cores at uniform time intervals;

FIG. 11 is a vector diagram which may be used in the computation of the relative numbers of turns required for a uniform sequential switching pattern in the system of FIG. 8;

FIG. 12 is a similar vector diagram relating to the system of FIG. 9;

FIG. 13 is a diagrammatic vertical sectional view illustrating a video recording and playback system in accordance with the present invention utilizing only a single series of graded windings;

FIGS. 14 and 15 show the current waveforms in the common sweep winding and in the graded winding, respectively, for the head of FIG. 13;

FIG. 16 is a diagrammatic view showing the magnetizing forces produced in the transducer system of FIG. 13 by the respective current waveforms of FIGS. 14 and 15;

FIG. 17 illustrates a modified video transducer head which may also employ a single graded winding;

FIG. 18 is a somewhat diagrammatic top plan view of the head of FIG. 17;

FIG. 19 is a diagrammatic view showing a suitable winding arrangement for the head of FIG. 17;

FIG. 20 is a somewhat diagrammatic vertical sectional view illustrating a video recording and reproducing system having two series of oppositely graded windings and utilizing two phase excitation current for successively activating the head units cooperating with the magnetic record medium;

FIG. 21 is a somewhat diagrammatic side elevational view of one embodiment of head unit for the system of FIG. 20;

FIG. 22 is a side elevational view of a second embodiment of head unit and associated shielding lamination for the head of FIG. 20;

FIG. 23 is an end elevational view of the head unit of FIG. 22;

FIG. 24 is a diagrammatic top plan view of a video head utilizing the head units of FIGS. 22 and 23 in stacked relation to provide a linear series of closely spaced non-magnetic gaps;

FIG. 25 is a diagrammatic view illustrating a suitable winding arrangement for the head of FIG. 24;

FIG. 26 shows the magnetomotive force vectors produced by the winding arrangement of FIG. 25;

FIG. 27 is a diagrammatic view of a modified winding arrangement for the head of FIG. 24;

FIG. 28 shows the m.m.f. vector diagram for the winding arrangement of FIG. 27; and FIGS. 29 and 30 show different types of m.m.f. vector diagrams for which transducer systems may be constructed in accordance with the present invention.

As shown on the drawings:

In my copending application Ser. No. 835,017 filed Aug. 20, 1959, there is disclosed a transducing system in which a series of magnetic cores have respective graded bias windings providing unidirectional saturating bias magnetomotive forces in the respective cores of respective different magnitudes and in which a sweep magnetomotive force is applied to all of the cores of saw-tooth waveform to switch the cores in succession from one polarity of magnetic saturation to the other.

The present application is based on the conception of utilizing an alternating polarity current waveform in the graded series of windings such as found in the system of my previous application. By this conception, a basically new transducer system is created wherein (1) the return sweep interval of the previous system is eliminated by providing in effect an instant return at the end of each scanning cycle, (2) the peak magnetic fields in the saturated parts of the cores are reduced by a factor of four as compared with the previous system, (3) current amplitudes, total number of winding turns, heating and magnetic leakage are all greatly reduced, allowing practical assemblies having about four times as many elements as with the direct current bias-graded winding system, and (4) residual magnetization, hysteresis, and similar types of unbalance in magnetic elements where direct current is present are eliminated.

While one form of the invention employs an alternating square wave bias such as shown in FIG. 15 of the present application, an alternative form comprises a transducer system having multiple series of graded windings excited by respective phases of a multiphase alternating current source. It has proved possible to utilize multiphase sinusoidal currents and to switch a series of cores at uniform intervals in a continuously recycling sequence without any sweep return interval.

In the following description, the general principles of the multiphase alternating current type transducer system will first be presented. Thereafter, the application of this system to magnetic recording and playback of video signals will be specifically set forth. Additionally, transducer systems of special design are described including the alternating square wave excited single graded winding type system previously mentioned.

FIGS. 1 through 6 illustrate a transducer system in accordance with the present invention wherein a series of eight cores 11 through 18 of a suitable magnetic material have a first series of graded windings 21–24 and 26–28 and a second series of graded windings 32–38 linking the respective cores indicated. The cores 11–18 represent saturable parts of respective video recording head units which block transducing action in saturated condition, and are successively switched through a non-saturated condition to scan a cooperating magnetic record medium. Suitable head configurations utilizing such saturating core parts are disclosed in my copending application Ser. No. 835,017 filed Aug. 20, 1959, of which the present application is a continuation in part. A series of output windings 41–48 may be coupled to the respective cores 11–18 where it is desired to utilize the change in magnetic condition of the respective cores with respect to time ($d\Phi/dt$) to generate electrical output waves.

For sequentially shifting the cores through a non-saturated condition, an alternating current source 50 is connected across the first series of windings 21–28 and may provide an output current $i_1$ as indicated at 51 in FIG. 2. A phase shifter network 52 is shown diagrammatically as interposed between the source 50 and the second series of windings 32–38 so as to supply a current $i_2$ of waveform as indicated at 53 in FIG. 2 to the second series of windings.

FIG. 4 illustrates diagrammatically the variation of magnetizing force (measured in ampere turns) in each of the respective cores as a function of time. The solid line 61 represents the magnetizing force applied to the core 11 by means of the current $i_1$ flowing in winding 21; the line 62 in FIG. 4 represents the magnetizing force applied to core 12 by means of winding 22; line 63 represents the magnetizing force in core 13 due to winding 23; curve 64 represents the variation of magnetizing force in core 14 resulting from the current $i_1$ in winding 24; curve 66 represents the variation in magnetizing force on core 16 due to winding 26; curve 67 shows the variation in ampere turns in core 17 due to winding 27; and curve 68 relates to the magnetizing force produced by winding 28 in core 18. Similarly, curve 72 shows the magnetizing force produced in cores 12 and 18 by current $i_2$ (having a waveform as shown at 53 in FIG. 2) in windings 32 and 38; curve 73 is related to windings 33 and 37; curve 74 is related to windings 34 and 36; and curve 75 illustrates the magnetizing force produced by winding 35 of core 15.

At the time represented by point 81 in FIG. 4, the magnetization of core 11 is changing from a positive polarity to a negative polarity to produce the $d\Phi/dt$ change in core 11 indicated at 91 in FIG. 3. (The positive direction of magnetomotive force is such as to produce a counterclockwise direction of magnetic flux in cores 11–18 as viewed in FIG. 1. A positive current $i_1$ thus produces a negative polarity magnetomotive force in the first core 11. This designation of a counterclockwise magnetomotive force as positive will be used throughout the present specification.) At point 82, the positive magnetizing force applied to core 12, represented by curve 72, will equal the negative magnetizing force applied to this core, represented by curve 62, so that the net magnetization of the core 12 will be switched from a positive value through zero to a negative value in the neighborhood of point 82, producing a $d\Phi/dt$ pulse in core 12 as represented at 92 in FIG. 3. Similarly at points 83, 84, 85, 86, 87 and 88, $d\Phi/dt$ pulses 93–98 will be generated in cores 13–18 respectively. As curve 61 relating to the magnetization of core 11 passes from negative polarity to positive polarity at point 101 in FIG. 4, a $d\Phi/dt$ pulse 111 is generated in core 11 of opposite polarity to the pulse 91 previously generated in this core. Similarly at points 102–108, pulses 112–118 will be generated in cores 12–18 of opposite polarity from the pulses 92–98 previously generated in these respective cores. Point 121 of the waveform of FIG. 4 corresponds to point 81 and represents the beginning of a new cycle with a new pulse which may be designated 91' in core 11.

Curve 130 in FIG. 5 is a plot of flux density (B) as a function of magnetizing force (H) for the material of each of the identical cores 11–18. Points 131–140 on curve 130 may represent successive magnetic conditions of each core over a cycle of operation. For example, at the time corresponding to point 81 in FIG. 4, core 11 of transducer unit A is making a transition from a positive polarity magnetization to a negative polarity magnetization and may be operating, for example, on portion 142 of the magnetization curve at point 135. At the instant of time that core 11 is in the magnetic condition represented by point 135, core 12 is positively magnetized as indicated by the instantaneous value of curve 72 in FIG. 4, and this condition of magnetization may correspond to point 136 in FIG. 4. That is, the instantaneous current in winding 32 of core 12 is sufficient to saturate core 12 at the instant of time represented by point 81 in FIG. 4 which corresponds to point 81' in FIG. 2 when the current $i_1$ through the first series of windings 21–28 is zero and the current $i_2$ through the second series of windings 42–48 is a positive maximum. Since windings 33, 34 and 35 have progressively greater numbers of turns, the magnetic condition of cores 13, 14 and 15 may be represented by points 137, 138 and 139 in FIG. 5 for the instant of time corresponding to point 81' in FIG. 2 and 81 in FIG. 4.

With respect to FIG. 5, at a succeeding instant of time corresponding to point 82 in FIG. 4, core 11 may assume a condition of magnetic saturation corresponding to point 134 on curve 130 while core 12 assumes a desaturated condition as represented by point 135. It will be apparent that each of the cores in succession moves from positive saturation through point 135 to negative saturation condition in the first half cycle of current waveform 51 to generate the successive pulses 91–98 of negative polarity. The successive cores assume successive conditions of negative saturation corresponding to points 134, 133, 132 and 131 and then are subjected to progressively decreasing degrees of negative magnetization corresponding to points 131, 132, 133 and 134 and then are shifted along a curve 144 through point 140. Any given core such as core 11 moves in sequence through magnetic conditions represented by points 135–134–133–132–131–132–133–134–140–136–137–138–139–137 – 136 and back to point 135 in a cycle of the applied current.

In order to provide equal time intervals between the switching of the successive cores through unsaturated condition, such equal intervals being shown in FIGS. 3 and 4, with sinusoidal applied currents of equal amplitude as indicated in FIG. 2, the windings must have numbers of turns which are related to a sinusoidal function as will be discussed in detail hereinafter. This sinusoidal grading is reflected in the positioning of points 131–134 and 136–139 on curve 130 in FIG. 5.

FIG. 6 illustrates a highly compact arrangement of the cores 11–18 of FIG. 1 and of the graded windings thereon where a certain degree of non-uniformity in time intervals between switching of the successive cores is acceptable or desired. As illustrated, the successive cores 11–18 are stacked so as to lie in parallel planes and in direct axial alignment. The graded windings are formed by means of conductors 150 and 151 which are wound in a spiral fashion about progressively greater numbers of the scores as illustrated. The portion of the conductors 150 and 151 actually linking the legs of the successive cores 11–18 may be of a flat tape or ribbon form with suitable insulation interposed between successive layers which are wrapped one on top of the other. In this way, a very compact transducer arrangement may be produced. The output, for example, may be taken by means of a conductor linking all of the cores in common.

In the diagrammatic illustration of FIG. 1 and in the showing of FIG. 6, the windings on cores 11–18 have been indicated as having 4, 3, 2, 1, 0, −1, −2 and −3 turns in the first series and 0, 1, 2, 3, 4, 3, 2 and 1 turns in the second series. If this were the actual arrangement of the windings, the successive $d\Phi/dt$ pulses in FIG. 3 would not be uniformly spaced in time with sinusoidal excitation. In some applications, a varying time interval between sucessive output voltage pulses in windings 41–48 or between switching of the successive cores would not be objectionable. If, however, equal time intervals between switching of the successive cores is desired with sinusoidal excitation, it is necessary to provide a sinusoidal variation in the number of turns linking the successive cores as will be explained in detail at this time.

Let the current through the two series of windings 21–28 and 32–38 in FIG. 1 be represented by the equations:

$$i_1 = I_1 \sin wt \qquad (1)$$

and $$i_2 = I_2 \sin\left(wt + \frac{\pi}{2}\right) = I_2 \cos wt \qquad (2)$$

where $w = 2\pi f$ radians per second ($f$ being the frequency of the applied currents $i_1$ and $i_2$ in cycles per second), $I_1$ = peak value of $i_1$ in amperes, and $I_2$ = peak value of $i_2$ in amperes.

The foregoing equations are written taking $t$ equal to 0 at point 81' in FIG. 2.

If the net magnetizing force in each of the cores 11–18 is to reach 0 in uniform successive time intervals, then the magnetizing force in core 12 must be 0 after $\tfrac{1}{16}$ of a complete cycle of current $i_1$, or:

$$i_1 T_{B_1} + i_2 T_{B_2} = 0, \text{ when } wt = \frac{\pi}{8} \qquad (3)$$

where
$T_{B_1}$ = number of turns of winding 22, and
$T_{B_2}$ = number of turns of winding 32.

T, the number of turns on any winding, is a positive number if it tends to set up a counterclockwise m.m.f. in the core when a positive current flows through the winding (in the direction indicated by arrow 99 or 100). A negative number of turns produces a clockwise m.m.f. component. Thus winding 22 has negative turns ($-T_{B_1}$), while winding 32 has positive turns ($T_{B_2}$).

Substituting Equations 1 and 2 in Equation 3:

$$I_1 T_{B_1} \sin \frac{\pi}{8} + I_2 T_{B_2} \cos \frac{\pi}{8} = 0 \qquad (4)$$

and $$I_1 T_{B_1} \sin \frac{\pi}{8} = -I_2 T_{B_2} \cos \frac{\pi}{8} \qquad (5)$$

If $I_1$ is taken equal to $I_2$, then:

$$\frac{T_{B_1}}{T_{B_2}} = \frac{-\cos \frac{\pi}{8}}{\sin \frac{\pi}{8}} \qquad (6)$$

Equation 6 indicates that the number of turns of windings 22 and 32 should have a ratio corresponding to cotangent $\pi/8$. The minus sign in Equation 3 takes account of the fact that for positive currents $i_1$ and $i_2$ as indicated by arrows 99 and 100 in FIG. 1, windings 22 and 32 generate opposing magnetomotive forces.

It is desirable that the peak magnetizing force applied to each of the cores be the same. For core 12, the maximum magnetizing force is as follows where $i_1$ and $i_2$ are 90° out of phase:

Maximum Magnetizing Force $= \sqrt{I_1^2 T_{B_1}^2 + I_2^2 T_{B_2}^2}$ or $$= I\sqrt{T_{B_1}^2 + T_{B_2}^2}, \text{ where } I = I_1 = I_2$$

In general, the following equation should be satisfied for equal peak magnetizing forces in transducer units A through H:

$$\sqrt{T_{A_1}^2 + T_{A_2}^2} = \sqrt{T_{B_1}^2 + T_{B_2}^2} = \cdots = \sqrt{T_{H_1}^2 + T_{H_2}^2} \qquad (7)$$

where $T_{A_1}$, $T_{B_1}$, $T_{C_1}$, $T_{D_1}$, $T_{E_1}$, $T_{F_1}$, $T_{G_1}$, and $T_{H_1}$ represent the number of turns of windings 21–28 ($T_{E_1}$ equals 0) and $T_{A_2}$, $T_{B_2}$, $T_{C_2}$, $T_{D_2}$, $T_{E_2}$, $T_{F_2}$, $T_{G_2}$, $T_{H_2}$ represent the number of turns of the respective windings of the second series 32–38 ($T_{A_2} = 0$).

If $T_1$ and $T_2$ represent the number of turns of the winding of the first series and of the winding of the second series on a particular core, $n$ represents the number of the core in the series of cores, and N equals the total number of cores, then Equation 6 may be generalized as follows:

$$\frac{T_1}{T_2} = \frac{\cos\left[(n-1)\frac{\pi}{N}\right]}{\sin\left[(n-1)\frac{\pi}{N}\right]} = -\frac{k\left[\cos(n-1)\frac{\pi}{N}\right]}{k\left[\sin(n-1)\frac{\pi}{N}\right]} \quad (8)$$

where $k$ is a constant depending on core size, etc.

In the present instance, N equals 8; and $T_1$ equals $T_{A1}$, and $T_2$ equals $T_{A2}$ when $n$ equals 1; $T_1$ equals $T_{B1}$, and $T_2$ equals $T_{B2}$ for $n$ equals 2; and so forth.

We note from Equation 8 that if we choose $$T_1 = -k \cos\left[(n-1)\frac{\pi}{n}\right] \quad (8A)$$

and $$T_2 = k \sin\left[(n-1)\frac{\pi}{n}\right] \quad (8B)$$

then Equation 7 is always satisfied, since $$\sqrt{(-k)^2 \cos^2\theta + k^2 \sin^2\theta} = k\sqrt{\cos^2\theta + \sin^2\theta} = k$$

regardless of the value of $\theta$.

To calculate a table of relative number of turns, we may for convenience let $k=100$. Substituting in (8A) and (8B) we obtain for core A, $$T_{A1} = -100 \cos 0 = -100$$
$$T_{A2} = 100 \sin 0 = 0$$

For core B, $$T_{B_1} = -100 \cos \frac{\pi}{8} = -93$$

$$T_{B_2} = 100 \sin \frac{\pi}{8} = 38 \text{ etc.}$$

In some designs a constant $a$ is added to each angle. This has the effect of advancing or retarding the firing time of all cores, and may be selected to give poly pulse output, or to equalize the total turns in each connected set of windings, or such that no core is without a winding for each phase, or series of windings. The equations then become:

$$T_1 = -k \cos[(n-1)\pi/N + a] \quad (8C)$$
$$T_2 = k \sin[(n-1)\pi/N + a] \quad (8D)$$

The actual number of turns to be utilized can be obtained by multiplying the relative values by a constant factor as soon as the actual maximum ampere turns needed for a particular series of magnetic cores has been determined either by calculation or empirically. The particular value of peak magnetizing force selected depends on the dimensions and material of the magnetic circuits, the permissible current amplitudes and other factors, as will be apparent to those skilled in the art.

For the case where the maximum magnetizing force exerted on each of the cores is equal and the time interval between shifting of the successive cores from one polarity of saturation to the other polarity is equal, the operation of the circuit of FIG. 1 may be represented by the vector diagram of FIG. 5A. The vector diagram of FIG. 5A may represent the instant of time corresponding to point 81' of FIG. 2 where current $i_1$ is 0, and current $i_2$ is a positive maximum (in phase with vector E). The vector A in FIG. 5A has a magnitude representing the maximum magnetizing force produced in the core 11 as a result of the current vector $I_1$ with which it is 180° out of phase in FIG. 5A. Thus $A = I_1 T_{A1}$. The magnitude of the vectors A through H thus corresponds to the abscissa value (in ampere turns) of maximum points 131 or 139 on curve 130 in FIG. 5. At the instant represented in FIG. 5A, the magnetizing force in core 11 is moving from a positive value to a negative value in conformity with curve 61 in FIG. 4 (and corresponding to the horizontal component of vector A as this vector rotates counterclockwise). The vector B, representing the maximum magnetizing force in core 12, lags vector A by $\pi/8$ radians (22½°) in the present example. Winding 22 and winding 32 must have the number of turns previously described by Equations 7 and 8 to provide the vector B lagging the vector A by 22½° and having the same magnitude as the vector A.

The vector A when considered as a vector rotating counterclockwise about the origin point in FIG. 5A with an angular velocity was given in Equations 1 and 2, has a horizontal components which varies with time in the same manner as represented by curves 61 in FIG. 4. In the same manner rotating vector B represents the summation of curves 62 and 72; vector C, the summation of curves 63 and 73; vector D, the summation of curves 64 and 74; vector E represents curve 75; vector F, curves 66 plus 74; vector G, curves 67 plus 73; and vector H, curves 68 plus 72. Equation 7 is equivalent to requiring the magnitudes of vectors A through H to be equal while Equation 8 is equilvalent to the requirement that the magnitude of the component of each vector A through H which is in phase with vector $I_1$ should be proportional to the number of turns of the corresponding winding of the $i_1$ series, and that the magnitude of the component of each vector in phase with vector $I_2$ is proportional to the number of turns of the $i_2$ series of windings on the same core. In terms of the vector diagram of FIG. 5A, it is apparent that the following relations should hold:

$$T_{A_1} I_1 = \overline{A} \quad (9)$$
$$T_{B_1} I_1 + T_{B_2} I_2 = \overline{B} \quad (10)$$
$$T_{C_1} I_1 + T_{C_2} I_2 = \overline{C}, \text{ etc.} \quad (11)$$

FIGS. 7, 8 and 9 represent transducing systems each having two series of graded windings but which provide respectively what may be termed single quadrant operation, two quadrant operation, and four quadrant operation, having reference to the respective corresponding vector diagrams of FIGS. 10, 11 and 12.

In FIG. 7, cores 201–205 have first and second series of graded windings 211–215 and 221–225 which progressively decrease and progressively increase, respectively, in numbers of turns linking the successive cores. The system of FIG. 7 may be supplied from an alternating current source 227 having an output current waveform $i_1$ such as indicated in FIG. 2 and coupled to a phase shifter 228 which supplies a 90° leading current waveform $i_2$ of the same amplitude as $i_1$ as indicated in FIG. 2. The system of FIG. 7 can be represented by a series of five vectors successively separated by 15° and all lying in one quadrant as shown in FIG. 10. The vectors 1–5 in FIG. 10 may represent the net magnetizing forces in cores 201–205 in the same way as described for the vector diagram of FIG. 5. The sequence of switching of the cores in FIG. 7, assuming a positive current $i_1$ produces a negative m.m.f. in core 201 while a positive current $i_2$ produces a positive or opposing m.m.f., will be core 201, then 202, then 203, then 204 and then 205. Windings 211–215 will have numbers of turns proportional to the vertical components of vectors 1–5 in FIG. 10 respectively, while windings 221–225 will have numbers of turns proportional to the horizontal components of these vectors for uniform switching intervals in each alternate quarter cycle.

The following table gives the relative numbers of turns for operation as shown in FIG. 10:

TABLE I.—RELATIVE NUMBERS OF TURNS FOR SYSTEM OF FIGURES 7 AND 10

A. First Series of Graded Windings

| Core | Winding | M.M.F. vector | Current vector | Relative number of turns |
|---|---|---|---|---|
| 201 | 211 | 1 | $I_1$ | $-\cos(\pi/20)$. |
| 202 | 212 | 2 | $I_1$ | $-\cos(3\pi/20)$. |
| 203 | 213 | 3 | $I_1$ | $-\cos(5\pi/20)$. |
| 204 | 214 | 4 | $I_1$ | $-\cos(7\pi/20)$. |
| 205 | 215 | 5 | $I_1$ | $-\cos(9\pi/20)$. |

TABLE I—Continued

B. Second Series of Graded Windings

| Core | Winding | M.M.F. vector | Current vector | Relative number of turns |
|---|---|---|---|---|
| 201 | 221 | 1 | $I_2$ | $\cos(9\pi/20)$. |
| 202 | 222 | 2 | $I_2$ | $\cos(7\pi/20)$. |
| 203 | 223 | 3 | $I_2$ | $\cos(5\pi/20)$. |
| 204 | 224 | 4 | $I_2$ | $\cos(3\pi/20)$. |
| 205 | 225 | 5 | $I_2$ | $\cos(\pi/20)$. |

The foregoing table is computed by observing the angles between vectors 1–5 and $-I_1$ for the first series of windings and between vectors 1–5 and $I_2$ for the second series. The minus relative number of turns in Table IA reflects the fact that a positive current $i_1$ in these windings produces a negative m.m.f. (i.e. a clockwise m.m.f. in cores 201–205).

The transducer system of FIG. 8 is closely analogous to the system of FIG. 1 and comprises a series of seven cores 231—237 having a first series of graded windings 241—247 and a second series of graded windings 252–257 linking the cores indicated. A vector diagram for the system of FIG. 8 for indicating relative numbers of turns is shown in FIG. 11. Windings 241–247 have numbers of turns proportional to the components of vectors 1–7 along the axis of vector $I_1$ while windings 252–257 have numbers of turns proportional to the components of vectors 2–7 lying along the axis of vector $I_2$. The switching order starting with the instant of time shown in FIG. 11 would be core 234, core 235, core 236, and then core 237 (from positive to negative saturation) and then cores 231–237 in order first from negative to positive saturation, and then from positive to negative saturation and so on, with equal time intervals between shifting of the successive cores from one polarity of saturation to the other and equality of maximum magnetization force exerted on the respective cores.

The following table gives the relative numbers of turns for operation as shown in FIG. 11:

TABLE II.—RELATIVE NUMBERS OF TURNS FOR SYSTEM OF FIGURES 8 AND 11

A. First Series of Graded Windings

| Core | Winding | M.M.F. vector | Current vector | Relative number of turns |
|---|---|---|---|---|
| 231 | 241 | 1 | $I_1$ | $-\cos 0 = -1$. |
| 232 | 242 | 2 | $I_1$ | $-\cos(\pi/7)$. |
| 233 | 243 | 3 | $I_1$ | $-\cos(2\pi/7)$. |
| 234 | 244 | 4 | $I_1$ | $-\cos(3\pi/7)$. |
| 235 | 245 | 5 | $I_1$ | $-\cos(4\pi/7)$. |
| 236 | 246 | 6 | $I_1$ | $-\cos(5\pi/7)$. |
| 237 | 247 | 7 | $I_1$ | $-\cos(6\pi/7)$. |

B. Second Series of Graded Windings

| Core | Winding | M.M.F. vector | Current vector | Relative number of turns |
|---|---|---|---|---|
| 231 | —— | 1 | $I_2$ | $\cos(\pi/2) = 0$. |
| 232 | 252 | 2 | $I_2$ | $\cos(5\pi/14)$. |
| 233 | 253 | 3 | $I_2$ | $\cos(3\pi/14)$. |
| 234 | 254 | 4 | $I_2$ | $\cos \pi/14$. |
| 235 | 255 | 5 | $I_2$ | $\cos \pi/14$. |
| 236 | 256 | 6 | $I_2$ | $\cos 3\pi/14$. |
| 237 | 257 | 7 | $I_2$ | $\cos 5\pi/14$. |

It will be observed that $\cos(4\pi/7)$, $\cos(5\pi/7)$ and $\cos(6\pi/7)$ are negative corresponding to the reversal of windings 245, 246 and 247 shown in FIG. 8. It will further be noted that windings 245, 246 and 247 will have positive numbers of turns since a positive current $i_1$ will produce a positive (counterclockwise) m.m.f. in cores 235, 236 and 237. Windings 241–244 will have a negative number of turns since a positive current $i_1$ will produce a negative (clockwise) m.m.f. in cores 231–234.

FIG. 9 represents a series of eleven magnetic cores 261–271 having respective series of windings 281–291 and 301–311 which may be proportioned to operate in accordance with the vector diagram of FIG. 12 wherein the rotating vectors 1–11 have horizontal components representing the net magnetizing forces exerted on the respective cores 261–271 as a function of time. With the transducer system of FIG. 9 having windings proportioned to operate as represented in FIG. 12 and starting with the instant of time shown in FIG. 12, core 268 will shift from negative to positive saturation after an electrical angle of $\pi/44$ radians ($4\tfrac{1}{11}°$). Core 262 will then be switched from positive to negative saturation $2\pi/22$ radians after the switching of core 268 and so on. The vectors 1–11 are successively angularly offset $2\pi/11$ radians to give uniform time intervals between $d\Phi/dt$ pulses, but the pulses are of alternate polarity in distinction to two quadrant operation (which is shown in FIG. 3). Each vector produces two $d\Phi/dt$ pulses per cycle (a positive pulse and a negative pulse) to provide 22 pulses total per $2\pi$ radians of angular rotation of the vectors of FIG. 12; a pulse thus occurs each time the vectors rotate $2\pi/22$ radians. The relative number of turns for the system of FIG. 12 are tabulated as follows:

TABLE III.—RELATIVE NUMBERS OF TURNS FOR SYSTEM OF FIGURES 9 AND 12

A. First Series of Graded Windings

| Core | Winding | M.M.F. vector | Current vector | Relative number of turns |
|---|---|---|---|---|
| 261 | 281 | 1 | $I_1$ | $-\cos(9\pi/44)$. |
| 262 | 282 | 2 | $I_1$ | $-\cos(17\pi/44)$. |
| 263 | 283 | 3 | $I_1$ | $-\cos(25\pi/44)$. |
| 264 | 284 | 4 | $I_1$ | $-\cos(33\pi/44)$. |
| 265 | 285 | 5 | $I_1$ | $-\cos(41\pi/44)$. |
| 266 | 286 | 6 | $I_1$ | $-\cos(49/\pi 44)$. |
| 267 | 287 | 7 | $I_1$ | $-\cos(57\pi/44)$. |
| 268 | 288 | 8 | $I_1$ | $-\cos(65\pi/44)$. |
| 269 | 289 | 9 | $I_1$ | $-\cos(73\pi/44)$. |
| 270 | 290 | 10 | $I_1$ | $-\cos(81\pi/44)$. |
| 271 | 291 | 11 | $I_1$ | $-\cos(\pi/44)$. |

B. Second Series of Graded Windings

| Core | Winding | M.M.F. vector | Current vector | Relative number of turns |
|---|---|---|---|---|
| 261 | 301 | 1 | $I'_2$ | $\cos(75\pi,44)$. |
| 262 | 302 | 2 | $I'_2$ | $\cos(83\pi/44)$. |
| 263 | 303 | 3 | $I'_2$ | $\cos(3\pi/44)$. |
| 264 | 304 | 4 | $I'_2$ | $\cos(11\pi/44)$. |
| 265 | 305 | 5 | $I'_2$ | $\cos(19\pi/44)$. |
| 266 | 306 | 6 | $I'_2$ | $\text{cls}(27\pi/44)$. |
| 267 | 307 | 7 | $I'_2$ | $\cos(35\pi/44)$. |
| 268 | 308 | 8 | $I'_2$ | $\cos(43\pi/44)$. |
| 269 | 309 | 9 | $I'_2$ | $\cos(51\pi/44)$. |
| 270 | 310 | 10 | $I'_2$ | $\cos(59\pi/44)$. |
| 271 | 311 | 11 | $I'_2$ | $\cos(67\pi/44)$. |

It may be noted that the angles shown in part A of Table III are those obtained by measuring counterclockwise from the $-I_1$ vector and that the angles for part B of Table III are those obtained by measuring counterclockwise from vector $I'_2$ in FIG. 12. The cosine of angles $25\pi/44$, $33\pi/44$, $41\pi/44$, $49\pi/44$, $57\pi/44$ and $65\pi/44$ in part A of Table III and of angles $27\pi/44$, $35\pi/44$, $43\pi/44$, $51\pi/44$ and $59\pi/44$ are negative corresponding to the reversal of windings 283, 284, 285, 286, 287 and 288, respectively, in the first series in FIG. 9 and corresponding to the reversal of windings 306, 307, 308, 309 and 310 in the second series.

In FIG. 12, the current $i_1$ has been assumed to be 90° leading with respect to current $i'_2$ whose positive direction is indicated by arrow 100' in FIG. 9, so that vector $I'_2$ lags vector $I_1$ by 90° in FIG. 12.

Studies of the vector and winding diagrams in this application makes many other relationships apparent. It will be noted that if the first series of graded windings is expressed as negative cosines of angles, the second series is expressed as sines of the same angles. Also the vectors can be made to rotate clockwise instead of counterclockwise by interposing currents $i_1$ and $i_2$ and the system will be equally operative, but the firing sequence is reversed. Where a lagging relation between exciting currents is shown, a leading one can be substituted with similar results. The M.M.F.'s can be depicted as projections of the M.M.F. vectors on the vertical instead of horizontal coordinate axis. Currents need not be equal, nor 90° from each other; and the turns can be adjusted so that equal M.M.F. vectors, at equal angles, will result in order to give equal time intervals. Or unequal magnitude and spacing can be obtained in any desired pattern. The M.M.F. vectors can be composed of more than two components. Some of these variations are further described below.

FIGS. 13 through 16 illustrate a first embodiment of magnetic transducer head in accordance with the present invention. The head comprises a series of head units such as indicated at 401–405 in FIG. 13 cooperating with successive adjacent tracks of a magnetic record medium 407. The record medium 407 may be a conventional magnetic tape record medium having a magnetizable coating in contact with the cores 411–415 of the head units. The cores may have any of the double loop configurations shown in my copending application Ser. No. 835,017 which include a non-magnetic gap for coupling the core with the cooperating channel of the record medium. Typical core configurations suitable for the present embodiment are illustrated in FIG. 17, FIG. 21, and in FIGS. 22 and 23 of the present application. Such cores comprise two pairs of legs connected together at their opposite ends to define two closed loop magnetic circuits each of which may be maintained saturated to inhibit coupling between the tape and an input or output winding, the cores being successively momentarily desaturated to scan the respective cooperating channels of the record tape in succession. Thus, referring to the core configuration of FIG. 21, each head unit 401–405 may comprise two pairs of legs 420, 421 and 422, 423 connected together at their respective adjacent ends as indicated at 425–428 to define a non-magnetic gap 430 at one end of the core for coupling to the record medium which preferably travels successively across the pole portions formed by core parts 425, 427 in FIG. 21. In FIG. 21, record medium 440 travels in the direction of the arrow 441, and tape 407 in FIG. 13 travels in the corresponding direction which is at right angles to the plane of FIG. 13. The respective legs may have respective windings 450–457 which link individual legs of the core while a winding 460 links each pair of legs in common. Windings 471–475 in FIG. 13 may each represent four individual windings corresponding to windings 450, 452, 454 and 456 in FIG. 21, while windings 481–485 may each correspond to windings 451, 453, 455 and 457 in FIG. 21. Windings 491–495 in FIG. 13 each correspond to windings 460, 748, 749 in FIG. 21.

In the embodiment of FIG. 13, winding 471–475 on each of the four legs of the cores 411–415 constitute graded windings. Thus, each of the winding units of winding 471 on the respective legs of the core 411 may have the same number of turns but a different number of turns than the winding units of winding 472 on the respective legs of the core 412. Windings 481–485 may constitute sweep windings in the embodiment of FIG. 13 and have the same number of turns on each of the legs of each of the cores 411–415. Windings 491–495 also would have the same number of turns on each core 411–415. Where windings have the same number of turns on each core, a single overall winding may be substituted.

In the embodiment of FIG. 13, an alternating square wave current 500, as shown in FIG. 15, is supplied to windings 471–475 from an alternating square wave source 501, while source 503 supplies a current waveform as indicated at 504 in FIG. 14 to the series of windings 481–485 in FIG. 13. A signal input or output amplifier component 507 is connected to the windings 491–495 either for supplying a signal to be recorded on the record tape 407 or for amplifying the electrical output from the series of head units during playback.

FIG. 16 illustrates the operation of the embodiment of FIG. 13 where, simply by way of illustration, winding 471 has zero turns, winding 472 provides a magnetizing force of one ampere turn, winding 473 a magnetizing force of two ampere turns, winding 474 a magnetizing force of three ampere turns, and winding 475 a magnetizing force of four ampere turns, as indicated diagrammatically for windings 472–475 by the alternating square wave form curves 512–515 in FIG. 16. The windings 481–485 provide an alternately reversed polarity saw-tooth waveform as indicated at 520 in FIG. 16, having a maximum magnetizing force greater than and opposite to the maximum magnetizing force for the graded winding 475 (indicated by waveform 515 in FIG. 16). Core 411 is in a magnetically neutral state at point 531 in FIG. 16. As the current progressively increases from source 503 to provide a progressively increasing magnetizing force as indicated at 520a in FIG. 16, the net magnetization in the cores 412–415 successively shifts from a positive polarity to a negative polarity at times corresponding to successive points 532–535. At point 531, and at subsequent point 541, the magnetization in core 411 is shifting from one polarity of saturation to the opposite polarity of magnetic saturation. In the next half cycle of the applied alternating square wave 500, the successive cores 411–415 are initially negatively saturated and are progressively switched to a positive saturation at times corresponding to points 541, 542, 543, 544, and 545 in FIG. 16. The cycle is then repeated. It will be observed that during the "ramp" portions of the saw-tooth waveform, such as indicated at 520a in FIG. 16, the interval between switching of the successive head cores may be equal, but that there is a "return time" involved between points 535 and 541, during which the saw-tooth returns to zero and the square wave current shifts its polarity. However, none of the cores change polarity during this return time.

In operation of the embodiment of FIG. 13 as a recording head, the input signal to be recorded would be supplied to windings 491–495 from component 507. At the time corresponding to point 531 in FIG. 16, each of cores 412–415 would be saturated, so that the applied signal flux from windings 491–495 would meet a relatively high reluctance in cores 412–415 and would have an inadequate value at the respective gaps of cores 412–415 to be recorded on the record tape 407. At core 411, however, the core would momentarily be in a magnetic neutral condition providing a relatively low reluctance path from winding 491 to the recording gap and consequently the instantaneous signal value would be recorded by means of core 411 on the corresponding channel of record tape 407. At a succeeding instant of time corresponding to point 532 in FIG. 16, core 411 would be negatively saturated due to the current waveform indicated at 504 in FIG. 14 flowing in winding 481. On the other hand, core 412 would be in the process of switching from positive to negative saturation and would instantaneously present a relatively high permeability to signal flux causing the instantaneous value of signal flux to be recorded on the second channel of tape 407 cooperating with core 412. At successive instants of time corresponding to points 533, 534 and 535, cores 413, 414 and 415 would be activated. All the cores remain negatively saturated during the interval x, y and are inactive. Thereafter, upon return of the current waveform 504 to its zero value, core 411 would be switched from negative saturation to a neutral condition and thus again activated to record the instantaneous signal value on the first channel of the tape.

It will be understood that the windings on the respective cores may be so wound that when windings corresponding to windings 450 and 456 in FIG. 21 produce magnetizing forces in the directions of arrows 560 and 561, and windings 452 and 454 produce magnetizing forces in the directions of arrows 562 and 563 in FIG. 21, the windings 451, 453, 455 and 457 will produce magnetizing forces as indicated by arrows 571–574 in FIG. 21 instantaneously opposing the directions of arrows 560–563.

As has previously been mentioned, the use of an alternating square wave source 501 instead of a direct current source, as described in my copending application Ser. No. 835,017, and utilizing a saw-tooth wave source as indicated at 503 of successively reversing polarity, major improvements have resulted including (1) reduction of peak magnetic fields in saturated parts of heads by a factor of four, (2) reduced current, fewer winding turns, less heating and less magnetic leakage, allowing practical assemblies having about four times as many elements as with direct current bias, and (3) freedom from residual magnetization, hysteresis, and similar types of unbalance inherent in magnetic elements where direct current is present. It will further be noted during the ramp part 504a of the saw-tooth waveform, the cores are successively switched to a given polarity of saturation, and are initially maintained in this polarity of saturation as the polarity of the saw-tooth waveform is reversed. In the system of my prior application, each core was switched from one polarity of magnetic saturation to the opposite polarity of magnetic saturation during the return time in the saw-tooth waveform. By eliminating this switching of the saturation polarity of the cores during the return cycles of the saw-tooth waveform, much higher scanning velocities are possible making the system much more practical for television recording and the like.

During use of the head as a playback head, the recorded signals on the respective channels of the tape meet with a relatively high reluctance path to the respective output windings 491–495 except at the successive instants when the cores are switched through a neutral condition. At these instants, a voltage is induced in the respective windings 491–495 corresponding to the successive instantaneous signals recorded on the respective channels of the tape 407. In this case, component 507 may represent an output amplifier for amplifying the signals successively produced in the windings 491–495 as a result of the signal recorded on the tape 407.

FIGS. 17, 18 and 19 illustrate a second embodiment of recording and playback head. A typical head unit 600 is shown in FIG. 17, while FIG. 19 illustrates a diagrammatic fragmentary sectional view of the overall head assembly which may include a large number of head units such as indicated at 600 having their respective gaps such as indicated at 601 arranged in a straight line across the tape 603 which may travel in the direction of the arrow 604 in FIG. 17. The overall multiple gap head assembly, as seen in FIG. 18, has been designated by the reference numeral 610.

Each individual head lamination unit such as 600 comprises two pairs of legs 611, 612 and 613, 614 having connecting portions 617 and 618 defining gap 601 and having opposite connecting portions 619 and 620 to define two closed loop saturable magnetic circuits. Each of the legs 611–614 receives a respective graded winding 621–624 which may instantaneously produce magnetizing forces as indicated by arrows 631–634 in FIG. 17. Sweep windings are indicated at 651–654 in FIG. 17 which provide magnetizing forces of polarity instantaneously opposing the graded windings bias magnetizing forces as indicated by arrows 661–664 in FIG. 17.

In this embodiment, a ferrite core 670 extends across the entire width of the tape 603 on the back or inactive side thereof having the non-magnetizable surface. This core has a winding 671 thereon coupled to the input or output video amplifier component 507 and has a longitudinal gap as indicated at 672 extending continuously across the width of the tape in vertical alignment with the successive gaps 601 of the head units such as indicated at 600 which cooperate with the active magnetizable surface of the tape 603.

In the recording process, the signal current fed to the coil 671 by itself establishes a signal magnetic field below the threshold of tape magnetization. A recording bias supply indicated at 675 is connected to windings 676 and 677 which tend to produce a bias flux across the gap 601 between pole portions 617 and 618, the return bias flux path being indicated by the arrows 678 in FIG. 17. With the head units in their normal saturated condition, the recording bias supply does not supply a sufficient recording bias field at the tape to cause the signal field from core 670 to be recorded thereon. However, at the instant when a given head unit is desaturated, the recording bias field when superimposed on the signal field is adequate to produce the desired magnetization of the record tape 603. The degree of magnetization of the tape depends entirely on the magnitude of the signal strength from core 670 at the instant the head unit is activated. The recording bias supply 675 may provide direct current, an alternating square wave current having a frequency equal to the frequency of the bias supply 501, FIG. 19, a sinusoidal alternating current waveform having a frequency equal to the scanning frequency multiplied by the number of head units, or other controlled current suitable for the desired purpose.

FIG. 19 illustrates one leg 611, 611a–611i of each of a series of head units such as the unit 600 shown in FIG. 17 in diagrammatic cross section with the graded winding 680 (represented in part by winding 621 in FIG. 17) linking the successive legs with successively fewer numbers of turns. Specifically, the graded winding links legs 611, 611a–611i with 9, 8, 7, 6, 5, 4, 3, 2, 1 and 0 turns, respectively. A coil 681 is shown as linking all of the legs in common to provide a winding corresponding to winding 651 for leg 611 in FIG. 17, while a coil 682 links legs 611, 611a–611i and the other legs corresponding to leg 612 in FIG. 17 and represents the winding 676 in FIG. 17. The graded winding bias supply 501 for energizing the graded winding 680 may deliver the same waveform as indicated in FIG. 15, while the sweep supply 503 may deliver the waveform indicated in FIG. 14 to provide successive desaturation of the legs 611, 611a–611i in the same manner as described in connection with FIG. 16. More cores can be used than shown here for illustration. Sinusoidal excitation may be used for both the sweep supply and graded winding supply under conditions where linearity is achieved by compensation or is not critical.

By way of example, if the alternating square wave 500 from graded winding bias supply 501 has a frequency of 60 cycles per second, the recording bias supply 675 may deliver an alternating square wave current in phase with the current waveform 500 and of a frequency of 60 cycles per second. If high frequency bias is to be used, the recording bias frequency for ten head units would be 600 cycles per second so that a positive peak of the bias current would occur at the instant of each head unit's desaturation.

While the embodiment of FIGS. 17, 18 and 19 has been described as energized by the sweep and graded winding bias waveforms of FIGS. 14 and 15, it will be understood that sinosoidal excitation currents may be utilized with oppositely graded windings as described in connection with the embodiments of FIGS. 1 through 12, with recording bias supply 675 providing either a study unidirectional current or a high frequency alternating current synchronized to apply a peak bias m.m.f. each time one of the cores is switched through non-saturated condition.

The embodiment of FIGS. 20 and 21 may comprise a recording and playback head utilizing two-phase sinusoidal exciting currents, and operating generally in the manner described for FIGS. 8 and 11 herein. It will be understood that each saturable magnetic loop of head units 701–707 such as the loop 420, 425, 421, 426 and the loop 422, 427, 423, 428 of head unit 702 in FIG. 21 receives graded windings as disclosed for the core loops 231–237 in FIG. 8. A first series of graded windings may have equal numbers of turns on each of the four legs of each head unit as indicated at 450, 452, 454, 456 in FIG. 21. The number of turns of winding assemblies 711–717 for the head units 701–707 progressively varies from one winding assembly to the next generally as indicated for windings 241–247 in FIG. 8. It will be understood that winding assembly 712 in FIG. 20, for example, represents individual windings 450, 452, 454 and 456 in FIG. 21.

A second series of winding assemblies 721–727 in FIG. 20 is connected with phase shifter component 228 in the same manner as disclosed for windings 252–257 in FIG. 8, the winding assembly 722 in FIG. 20 representing, for example, individual windings 451, 453, 455, 457 connected in series and linking the respective legs 420, 421, 422, 423. The signal input or output amplifier component 720 is connected with winding assemblies 731–737 and 741–747, which may be connected successively in series with respect to the signal input or output amplifier component 720 as indicated in FIG. 20. The winding assembly 732, for example, corresponds to winding 460 in FIG. 21, and the winding assembly 742 in FIG. 20 corresponding for example to windings 748 and 749 in series in FIG. 21. The windings such as 460 may be connected to establish magnetizing forces as indicated at 750 for current flow as indicated by arrow 755 while windings 748 and 749 instantaneously generate opposing magnetizing forces as indicated by arrows 751–754 in FIG. 21. The effect of the compensating windings 748, 749 on the characteristics of the head units is discussed in detail in my copending application Serial No. 835,017. Generally, it may be stated that when compensating coils are connected as shown at 748, 749 near the gap 430, they form a bridge circuit which is balanced when the core permeability decreases to a certain value, reducing the signal more rapidly and more completely as legs 420–423 become saturated than would be the case without these coils. Thus, if a signal current is applied to windings 460, 748 and 749 in series, and a bias current of steady value is applied to one of the series of windings such as 450, 452, 454 and 456, the output flux from the head measured at the gap 430 decreases relatively rapidly as a function of bias current to windings 450, 452, 454, 456. The output signal field reaches a minimum and then increases again relatively slowly with increasing bias current. With more compensating turns, sensitivity further increases, and output decreases even more rapidly as a function of bias current, reaching its minimum with less bias current. With more turns, however, the output returns to a higher value beyond the balance point of applied bias current. In one experimental arrangement with compensating turns such as indicated at 748, 749 wound on saturable portions of the core as shown in FIG. 21, the minimum is reached rapidly as a function of bias current, followed by a maximum return which is still 42.5 decibels below the no-bias signal field. A 60 decibel reduction of signal field is obtained at the balance point which is far more than required in any video system, and can be sacrificed to improve sensitivity.

The operation of the embodiment of FIGS. 20 and 21 will be substantially that described in connection with FIGS. 8 and 11. Because of the sinusoidal grading of the series of windings 711–717 and 721–727, the cores will be successively switched from one polarity of saturation to the other at equal time intervals and then in the same sequence will be switched back to the first polarity and so on. During recording, the respective cores when saturated provide sufficient reluctance to prevent effective recording of the signal on the record medium 440. However, at the instant the core is switched to non-saturated condition, an effective signal recording field will appear at the gap 430 of the activated head unit. During playback, the signal flux from the tape 440 will be presented with a relatively high reluctance at the saturated head units and will only be effective to induce appreciable net voltage in the output windings 731–737 at the respective instants when the head units are desaturated. The compensating coils 741–747 provided a balancing voltage to counteract the voltage induced in coils 731–737 under saturated conditions, but do not change the general operation of the head assembly.

When both series of windings linking the gating portion of the core are graded according to a sinusoidal function as in FIGS. 20 and 21, a linear sweep or scanning of the successive cores is obtained with zero return time. The scanning sequence may be cores 701 through 707 in succession and then core 701 again in the same way as described in connection with FIG. 8.

The time for a full sweep of the series of head units is a half cycle of the control frequency from source 227, so that in American standard television, the frequency of source 227 would be 7875 cycles per second instead of the 15,750 cycle saw-tooth waveform used in previous copending application Ser. No. 835,017. The lower frequency as well as the sinusoidal waveform which are utilized in accordance with the present invention make it easier to isolate transient pick-up in the signal system. The sinusoidal oppositely graded windings energized by sinusoidal waveforms give equal time intervals between activation of adjacent cores. Other distributions of the windings do not give linear time intervals, but in any case the playback on a similar head will compensate for such differences. A 359 channel head using sinusoidal excitation of oppositely graded windings will provide approximately the quality corresponding to present video standards. Since approximately 17% of the horizontal sweep in a conventional video signal is reserved for return, which is unnecessary with the present system, 60 head units can be omitted, leaving a net requirement of 299 heads per line of the television signal.

The following Table IV gives the winding pattern for a video head such as shown in FIG. 20 utilizing a series of 12 head units instead of the 7 shown in FIG. 20:

TABLE IV.—WINDING PATTERN FOR VIDEO HEAD HAVING TWELVE HEAD UNITS

| Head Unit No. | 1 | 2 | 3 | 4 | 5 | 6 | 7 | 8 | 9 | 10 | 11 | 12 |
|---|---|---|---|---|---|---|---|---|---|---|---|---|
| First Series Of Windings (No. Of Turns) | 0 | −26 | −50 | −71 | −87 | −97 | −100 | −97 | −87 | −71 | −50 | −26 |
| Second Series of Windings (No. of Turns) | 100 | 97 | 87 | 71 | 50 | 26 | 0 | −26 | −50 | −71 | −87 | −97 |

Thus if FIG. 20 is considered to be a fragmentary showing of a series of 12 head units, winding 711–717 would have zero, 26, 50, 71, 87, 97 and 100 turns while winding 721–727 would have 100, 97, 87, 71, 50, 26 and zero turns.

The foregoing Table IV was computed by means of a vector diagram having vectors 1 through 12 plotted $\pi/12$ radian (15°) apart in quadrants I and IV, with the phases of the exciting currents adjusted so that the current from alternating current source 227 leads the current from phase shifter 228 by 90° corresponding to the relationship of vectors $I_1$ and $I'_2$ in FIG. 12 and with the magnetomotive force vector for core number 1 being in phase with vector $I'_2$.

FIGS. 22 and 23 illustrate a modified core configuration for the head of FIG. 20. In this embodiment each head unit comprises a pair of symmetrical core sections 770 and 771 of magnetic material defining therebetween a front non-magnetic gap 772 for coupling to the record medium 440 which may travel in the direction of arrow 441 as in FIG. 21. The core sections also define a back gap 774 which may be symmetrical with respect to the front gap 772. The core sections further comprise respective legs 781–784 which are to receive windings such as indicated at 450–457 in FIG. 21. The legs 781–784 are connected by core portions 786–789 at points relatively remote from the gaps 772 and 774 as compared with the embodiment of FIG. 21 to tend to isolate the gap 772 from the circulating magnetic fluxes associated with the legs 781–784. Common core portions 791–794 extend from the respective connecting portion 786–789 to define the gaps 772 and 774. The common core portions are offset outwardly from the center lines of windows 806 and 808 to make the reluctance of the flux path from gap 772 through pole 791, outer leg 781, pole 792 to gap 774 as nearly as possible equal to the reluctance of the flux path from gap 772 through pole 791, inner leg 782, pole 792 to gap 774, and to make the reluctance of the corresponding inner and outer flux paths of core section 771 as nearly equal as possible.

For tending to isolate the core configuration 770, 771 of adjacent head units, spacer laminations 800 of high electrical conductivity material such as copper may be provided as indicated in FIGS. 22, 23 and 24. The copper laminations 800 may comprise an upper portion 801 having an arcuate edge as indicated at 801a for supporting the pole portions 791 and 793 adjacent the gap 772. A similar portion 802 may be provided for supporting pole portions 792 and 794 adjacent the gap 774 and having an arcuate margin as indicated at 802a. The copper lamination further includes notches as indicated at 804 and 805 and windows as indicated at 806, 807 and 808 to accommodate the windings such as indicated at 450–457 in FIG. 21. The copper lamination thus provides legs 811–814 of width exceeding the width of the corresponding legs 781–784 of the magnetic core sections 770–771. The lamination 800 may be split along its vertical axis as indicated by dotted lines 816 and 817 in FIG. 22 and as indicated by line 876 in FIG. 24 for convenient manufacture and accurate assembly.

By way of example, the respective magnetic legs 781–784 may be operated in the same manner as described in connection with FIGS. 8 and 11. Alternatively, twelve head units may be provided with the windings on each leg having the numbers of turns indicated in Table IV above.

FIG. 24 shows a stacked series of four head units 831–834 of configuration generally corresponding to FIG. 22, followed by four head units 835–838 of configuration similar to the lamination unit shown in FIG. 22 but having a much wider window 807 so as to accommodate windings such as diagrammatically indicated at 860–863 clear of the windings 864–867 on the adjacent legs of such larger laminations. Thus, the wider laminations have windings as indicated at 864–867 which are entirely laterally offset from the windings such as 860 and 863. FIG. 24 shows four alternate stacks 871–874 wherein stacks 871 and 873 are made up of four relatively narrow laminations as shown in FIG. 22 while stacks 872 and 874 each have four of the wider laminations just described. The assembly of FIG. 24 is perfectly symmetrical with respect to the line of non-magnetic gaps indicated at 876 and representing the respective gaps 772 of successive head units.

FIGS. 25 and 26 illustrate a convenient winding arrangement for a multiple head such as indicated in FIG. 24, FIG. 25 showing one leg of successive head units in cross section. Legs 901–904 in FIG. 25 may each correspond to a leg such as 781 in FIG. 22. Legs 901–904 may comprise respective gaps of head units 831–834 in FIG. 24 linked by winding 860. Legs 905–908 in FIG. 25 may comprise the respective outside legs of head units 835–838 associated with winding 864 in FIG. 25. Similarly, legs 909–912 may represent the respective outside legs associated with winding 917 of stack 873, and legs 913–916 may be associated with winding 918 of stack 874.

Winding 930 in FIG. 25 will be seen to link legs 901–904 in common, and then to link cores 905, 906, 907 and 908 with progressively fewer numbers of turns. Thereafter, winding 930 links legs 909, 910, 911 and 912 with progressively increasing numbers of turns which are wound in the opposite direction (to provide negative numbers of turns under the conventions adapted herein) as compared to the turns linking legs 905–908, after which winding 930 links legs 913–916 in common with a predetermined number of negative turns. Winding 931 links legs 901–904 with progressively increasing numbers of turns, then links legs 905–908 in common in the same direction of winding and also links legs 909–912 with the same winding direction, after which winding 931 links legs 913–916 with progressively fewer numbers of turns in the same (positive) winding direction.

FIG. 26 illustrates a vector diagram for the winding arrangement of FIG. 25 wherein the increments along the horizontal or vertical axis between the successive vectors 1–16 representing the magnetizing forces in legs 901–916 are equal. With the rectangular variation in vector magnitudes as indicated in FIG. 26, the maximum magnetizing forces exerted on legs 901–904 progressively increase, while the maximum magnetizing forces in legs corresponding to vectors 5 through 8 progressively decrease. It will observed that the horizontal components of vectors 1, 2, 3 and 4 are all equal while the vertical components of vectors 4, 5, 6, 7, 8, 9, 10, 11 and 12 are all equal and that the horizontal components of vectors 12, 13, 14, 15 and 16 are all equal. With this arrangement of vectors, leg 908 is being switched from positive to negative saturation at the instant of time represented in FIG. 26, after which legs 907, 906, 905, 904, 903, 902 and 901 are successively switched from positive to negative saturation. Thereafter, core legs 916 through 901 in that order are switched from negative saturation to positive saturation in sequence, and then in the same order are switched from positive saturation to negative saturation. The result is that a tape traveling over the line of gaps 876 in the direction of arrow 950 in FIG. 24 is scanned by first activating the head unit of stack 874 having associated therewith leg 916 then progressively across the width of the tape until the head unit 831 having leg 901 is activated, after which the head unit corresponding to core leg 916 is again activated.

For the vector diagram of FIG. 26, it will be understood that the vertical components of vectors 1–4 in phase with current vector $I_2$ may increase in magnitude in equal steps with the steps equal to an integral number. Thus the vertical components of vectors 1–4 may be 1, 2, 3 and 4, respectively.

The relative number of turns for the system of FIGS. 25 and 26 is tabulated as follows:

TABLE V.—RELATIVE NUMBERS OF TURNS FOR SYSTEM OF FIGURES 25 AND 26

| Core Leg | Vector | Number of turns winding 930 (current $i_1$) | Number of turns winding 931 (Current $i_2$) |
|---|---|---|---|
| 901 | 1 | 4 | 1 |
| 902 | 2 | 4 | 2 |
| 903 | 3 | 4 | 3 |
| 904 | 4 | 4 | 4 |
| 905 | 5 | 3 | 4 |
| 906 | 6 | 2 | 4 |
| 907 | 7 | 1 | 4 |
| 908 | 8 | 0 | 4 |
| 909 | 9 | −1 | 4 |
| 901 | 10 | −2 | 4 |
| 911 | 11 | −3 | 4 |
| 912 | 12 | −4 | 4 |
| 913 | 13 | −4 | 3 |
| 914 | 14 | −4 | 2 |
| 915 | 15 | −4 | 1 |
| 916 | 16 | −4 | 0 |

If a system similar to that of FIG. 20, but with sixteen head units as represented in FIG. 26, is to operate with a square vector envelope as in FIG. 26 but with equal angles between the successive vectors 1–16, the vertical components of vectors 1–4 in phase with current vector $I_2$ are a function of the cotangent of the angle between the current vector $I_2$ and the respective vectors 1–4. Vector 8 and the horizontal components of vectors 1–4 may be assigned an arbitrary value of unity, in which case the vertical components of vectors 1–4 are equal to the cotangent of their respective angles with vector $I_2$. For example, the vertical component of vector 2 would be equal to the magnitude of vector 2 multiplied by cos $(6\pi/16)$, while the magnitude of vector 2 would equal $1/\sin (6\pi/16)$, so that the vertical component of vector 2 could be expressed as $\cos (6\pi/16)/\sin (6\pi/16)$ or $\cot (6\pi/16)$.

A representative table of relative number of turns for a sixteen core square envelope equal angle vector diagram semiliar to FIG. 26 is as follows:

TABLE VI.—RELATIVE NUMBERS OF TURNS FOR A SIXTEEN CORE TRANSDUCER SYSTEM HAVING SQUARE ENVELOPE VECTOR DIAGRAM SIMILAR TO FIGURE 26, BUT WITH EQUAL ANGLES BETWEEN SUCCESSIVE VECTORS

| | Vector | Number of turns first series of windings | Number of turns second series of windings |
|---|---|---|---|
| Core No.: | | | |
| 1 | 1 | 100 | 19.9 |
| 2 | 2 | 100 | 41.4 |
| 3 | 3 | 100 | 66.9 |
| 4 | 4 | 100 | 100 |
| 5 | 5 | 66.9 | 100 |
| 6 | 6 | 41.4 | 100 |
| 7 | 7 | 19.9 | 100 |
| 8 | 8 | 0 | 100 |
| 9 | 9 | −19.9 | 100 |
| 10 | 10 | −41.4 | 100 |
| 11 | 11 | −66.9 | 100 |
| 12 | 12 | −100 | 100 |
| 13 | 13 | −100 | 66.9 |
| 14 | 14 | −100 | 19.9 |
| 15 | 15 | −100 | 0 |
| 16 | 16 | −100 | |

Transducer systems having magnetomotive force vector diagrams with vectors of equal magnitude and equal angular spacing can be attained to any desired degree of accuracy where the magnetic circuits are individually wound, and a reasonably large number of turns are used. For certain applications, however, it is convenient or desirable to use a transducer system wherein the magnetizing force vector diagram has vectors of unequal magnitude and/or spacing. This is true for stacked cores with common windings, as in a head for video recording such as indicated in FIG. 24, for example. For stacked cores as shown in FIG. 24, the assembly procedure is simplified by the use of a graded ribbon winding and a common winding in the manner indicated in FIG. 25 and Table V. The overall head assembly may be divided into a plurality of sub-assemblies as indicated at 871–874 in FIG. 24 each having a linearly graded winding and a common winding.

With linear grading of one winding, and no grading of the other winding on each group of four head units as in FIG. 25, the angular distances between vectors 4 and 5, for example, in the vector diagram of FIG. 26 will be smaller than between vectors 7 and 8, so that a video image recorded with the head of FIGS. 24–26 may be compressed somewhat on the magnetic record medium at the tracks scanned by head units corresponding to vectors 3, 4 and 5, for example, as compared to the tracks associated with the head units of vectors 7, 8 and 9, for example. By using the same transducer head system on playback, the original video signal is accurately reproduced even though the times of activation of the successive head units may not be uniformly spaced. The vector diagram of FIG. 26 is based on a sinusoidal current $i_2$ in winding 931 leading a sinusoidal current $i_1$ in winding 930 by 90° as indicated by the current vectors $I_2$ and $I_1$ in FIG. 26 with the currents being of equal magnitude. Non-sinusoidal excitation currents could be used with linearly graded windings as shown in FIG. 25 to give equal time intervals between switching of the successive cores using the principles illustrated in FIG. 16.

It will be understood with respect to Table VI, that while the actual computed value for the number of turns for the $i_2$ winding on core 1, for example, is $$100 \cot (7\pi 16) = 19.9$$

turns; in practice 20 turns would be chosen. Similarly, the number of turns of winding 712 per leg while computed at 40.6 might be chosen as 41 turns with adequate accuracy in the intervals between activation of the successive legs such as 901–903.

While a relatively few cores have been illustrated in FIGS. 24 and 25 for illustrative purposes, a larger number such as 360 or 525 head units can be chosen to define a line of video information across the width of the tape. On the other hand, a smaller number of cores may be used than the number of lines per frame of the video signal, and the head array swept more than once to define one picture line. Alternatively, if desired, one scan of the successive head units may contain multiple picture lines, or a fractional number of lines as previously mentioned. The selection of the number of head units to be employed depends on the width of tape which is to be used, the linear speed of the tape, the output and isolation per channel to be obtained with respect to the head units, the complexity of the head construction, and other factors.

FIG. 28 is a vector representation of the operation obtained by the winding pattern indicated in FIG. 27. FIG. 27 represents a diagrammatic cross sectional view similar to FIG. 25 and showing a series of legs 1001–1004 each corresponding to a leg of a head unit such as leg 420 in FIG. 21 or leg 781 in FIG. 22. Conductor 1110 links the legs 1001–1004 with 3, 2, 1 and 0 turns and receives a sinusoidal alternating current $i_1$ while conductor 1111 may link legs 1001–1004 with 1, 2, 3 and 4 turns respectively and receive a current $i_2$ of the same frequency and waveform as $i_1$ but 90° leading with respect to current $i_1$ as indicated by vectors $I_2$ and $I_1$ in FIG. 28. In order to produce the vector diagram of FIG. 28, a second series of four head units would have respective legs with windings having −1, −2, −3 and −4 turns and receiving a current $i_1$, and having 3, 2, 1 and 0 turns receiving a current $i_2$. The winding pattern is summarized in the following table:

TABLE VIII.—WINDING PATTERN FOR FIGURES 27 AND 28

| Core Leg | Vector | Number of turns of conductor 1110 (Current $i_1$) | Number of turns of conductor 1111 (Current $i_2$) |
|---|---|---|---|
| 1001 | 1 | 3 | 1 |
| 1002 | 2 | 2 | 2 |
| 1003 | 3 | 1 | 3 |
| 1004 | 4 | 0 | 4 |
| | 5 | −1 | 3 |
| | 6 | −2 | 2 |
| | 7 | −3 | 1 |
| | 8 | −4 | 0 |

While FIGS. 5A, 10, 11, 12, 26 and 28 have shown vector "envelopes" of circular or rectangular shape, a system having any arbitrary shape vector envelope such as that indicated in FIG. 29 can be constructed since by the method described herein any magnitude and phase angle can be set for the magnetizing force applied to a given core of a series of cores. The currents $i_1$ and $i_2$ for the respective series of windings on the cores can have any desired phase relationship other than zero or 180° as indicated by the vectors $I_1$ and $I_2$ in FIG. 29. The current amplitudes $I_1$ and $I_2$ need not be equal, the m.m.f. vectors can be composed of more than two out-of-phase currents, and other variations will be apparent to those skilled in the art from the basic principles described herein.

In the case where an even number of cores are to be switched singly in sequence, the corresponding magnetomotive force vectors are arranged in a 180° sector if the intervals between switching of the successive cores are to be uniform. To provide a 360° symmetrical arrangement of vectors with alternate polarity switching, an odd number of cores is required. For various special purposes, a system corresponding to less than a 180° distribution of vectors can be used, or uniform spacing of vectors may be provided except for the omission of vectors at desired angular positions to give corresponding double or other multiple time intervals provided between switching of selected cores of the series. Alternatively, a plurality of cores in a given system may be switched simultaneously in the same or opposite directions, corresponding to a plurality of magnetomotive force vectors either in phase or 180° out of phase in the vector diagram for the system.

It will be understood that a system corresponding to an 180° distribution of vectors and having an odd total number of cores can be operated as a 360° system by reversing the windings on every alternate core (assuming the vectors and cores are initially arranged in a corresponding sequence). This reversal of alternate windings of each series of windings on the cores has the effect of reversing alternate vectors, for example the even numbered vectors, shifting the vectors 180° with respect to the vector diagram. The $d\Phi/dt$ pulses which for a 180° vector distribution would correspond to pulses 91–97 and 111–117 in FIG. 3 with equal spacing would be altered by shifting the even numbered vectors 180° to provide pulses 92, 94, 96, 112, 114 and 116 of opposite polarity from that shown in FIG. 3 to provide a resultant alternating $d\Phi/dt$ waveform wherein one core shifts from positive saturation to negative saturation and the next core in the sequence shifts from negative saturation to positive saturation.

By varying the amplitude and angle of the successive magnetomotive force vectors corresponding to a series of cores, the output wave can be made into a desired form containing amplitude and/or frequency modulation. For example, some of the waves can have greater amplitude than others, or can be omitted. The output wave can be frequency modulated at the fundamental rate or a multiple thereof.

In FIG. 25, adjacent cores are generally of the same polarity. An arrangement where adjacent cores are generally of alternately opposite polarity is advantageous in some cases, for example in the case where the cores are close together. A vector diagram corresponding to a series of successively adjacent cores 1–7 wherein adjacent cores such as 1 and 2, 2 and 3, etc. will be of generally alternately opposite polarity is indicated by the vector diagram of FIG. 30. With respect to FIG. 30 assuming a series of seven cores where the first core corresponds to vector 1, the second core to vector 2 and so forth, at the instant indicated, cores 6, 1, 3 and 5 have a positive net magnetization while cores 2, 4 and 7 have a net negative magnetization. Generally, the second core corresponding to vector 2 will have opposite polarity from the first and third cores, the fourth core will have opposite polarity from the third and fifth cores, the fifth core will have opposite polarity from the fourth and sixth cores, and the sixth core will have opposite polarity from the fifth and seventh cores.

In American standard television, approximately 17% of the horizontal scan time is blanked out for the return sweep. Cores corresponding to this blanked out portion may be omitted; for example cores corresponding to vectors 15 and 16 in FIG. 26 may be omitted.

It will be apparent that many further modifications and variations may be effected without departing from the scope of the novel concepts of the present invention.

I claim as my invention:

1. A magnetic head comprising a magnetic core having a signal flux path including a magnetic pole portion with a non-magnetic gap adjacent thereto for receiving a magnetic record medium and said signal flux path including two spaced legs in parallel with respect to said signal flux path, said two legs providing a loop magnetic circuit including said two legs in series but excluding said gap, bias winding means encircling each of said legs of said loop magnetic circuit and connected to establish a series saturating bias flux in the circuit and through said two legs in series to saturate the two legs, control winding means encircling each of the two legs of said loop magnetic circuit for providing a control flux opposing the bias flux produced by the bias winding means in said two legs, signal coupling means coupled with said signal flux path including said two legs in parallel and said pole portion for providing interlinkage between an electric signal in said signal coupling means and a magnetic signal flux in said gap adjacent said pole portion, and means for connecting a control signal with said control winding means of magnitude to effectively place said two legs in unsaturated condition wherein the improvement comprises means comprising said control signal connecting means connected with said bias winding means and said control winding means for supplying bias and control signals thereto of alternating polarity and of cooperating waveform to cyclically place said two legs in unsaturated condition.

2. In combination, a series of magnetic cores arranged in laterally offset aligned relation and having respective signal flux paths including respective pole portions and respective gaps adjacent thereto for coupling with successive transversely offset portions of a record medium and said signal flux paths including respective pairs of spaced legs extending in parallel with respect to the respective signal flux paths, the two legs of each pair providing a loop magnetic circuit including at least one of the pole portions but excluding the associated gap, bias winding means coupled to said loop magnetic circuits to establish series saturating bias fluxes in the associated pole portions, common signal coupling means coupled to all of said cores in common and coupled to the two legs of each of said pairs in parallel for providing interlinkage between an electric signal circuit and each of said gaps, sweep generator means coupled to said loop magnetic circuits for providing a sweep current with a cyclically repeating current waveform and with the current waveform progressively changing during each cycle, and means whereby said sweep current is operative to successively desaturate the pole portions of the respective cores in succession in each cycle of said sweep generator means, wherein the improvement comprises means comprising said bias winding means and said sweep generator means for supplying saturating bias fluxes of alternating polarity and for providing a sweep current of alternating polarity and of a waveform to successively desaturate the pole portions of the respective cores in succession in each cycle of said alternating polarity sweep current.

3. In combination, magnetic core means comprising a pair of separate magnetic core sections having respective magnetic pole portions defining therebetween a non-magnetic gap, at least one of said core sections comprising a closed loop continuous ferromagnetic circuit including the associated magnetic pole portion but excluding said gap and excluding the other of said magnetic core sections, means operative to establish a circulating flux in said closed loop continuous ferromagnetic circuit of amplitude to place the associated magnetic pole portion in a saturated condition, and means selectively operative to oppose said circulating flux establishing means to place said magnetic pole portion in a non-saturated condition wherein the improvement comprises means comprising said circulating flux establishing means and said selectively operative means for exerting respective alternating polarity magnetomotive forces on said closed loop continuous ferromagnetic circuit of cooperating waveform to cyclically place said magnetic pole portion in a non-saturated condition.

4. In combination, a magnetic core having a loop magnetic flux path including a pole portion and a gap for coupling the loop magnetic flux path with a magnetic record medium, said loop magnetic flux path having a pair of spaced legs of ferromagnetic material extending in parallel with respect to said loop magnetic flux path and the two legs together providing a continuous ferromagnetic circuit, signal winding means coupled to said loop magnetic flux path relatively remote from said gap, compensating winding means encircling said loop magnetic flux path and disposed relatively closer to said pole gap generating a signal magnetomotive force in said loop magnetic flux path which is opposed with respect to the magnetomotive force of said signal winding means, and means for selectively saturating said legs of said continuous ferromagnetic circuit to relatively increase the effectiveness of said compensating winding means at said gap, wherein the improvement comprises said selectively saturating means comprising means for exerting first and second alternating polarity magnetomotive forces on said continuous ferromagnetic circuit of cooperating waveform to cyclically saturate and desaturate said legs.

5. A magnetic transducer head having a pair of separate magnetic cores with respective pole portions disposed in closely spaced relation for coupling to a magnetic record medium, said cores having respective pairs of spaced legs extending from the respective pole portions to define respective continuous ferromagnetic circuits, and the two legs of each continuous ferromagnetic circuit extending from the associated pole portion and defining symmetrical flux paths of substantially equal reluctance, and bias winding means on each of the legs for generating bias fluxes in each of the continuous ferromagnetic circuits, wherein the improvement comprises means comprising said bias winding means for exerting first and second alternating polarity magnetomotive forces on each of the ferromagnetic circuits for cyclically saturating and desaturating said circuits.

6. A magnetic recording head for recording a signal on a magnetic record medium comprising a pair of pole portions of magnetic material defining therebetween a gap for receiving a magnetic record medium, a pair of magnetic circuits connected to each of said pole portions and extending in spaced relation from each of said pole portions to define a substantially closed series magnetic circuit including each of said pole portions but excluding said gap, means for establishing circulating fluxes in said substantially closed magnetic circuit and through each of said pole portions adjacent said gap without crossing said gap, and means operating simultaneously with said circulating fluxes establishing means for establishing a magnetic signal flux at said gap between said pole portions varying in accordance with the signal to be recorded on the record medium, wherein the improvement comprises means comprising said establishing means for exerting first and second alternating polarity magnetomotive forces on said substantially closed magnetic circuit which are out of phase and of cooperating waveform to cyclically saturate and desaturate said substantially closed magnetic circuit.

7. A magnetic transducer head comprising a pair of magnetic pole pieces having confronting ends defining a gap for coupling to a magnetic record medium, a pair of magnetic circuits connected in parallel to each of said pole pieces and extending in substantially the same direction from each of said pole pieces in spaced generally parallel relation and defining a substantially closed series magnetic circuit including each of said pole pieces but excluding said gap, first winding means relatively closely adjacent said gap and linking said magnetic circuits in opposite effective winding directions for establishing circulating fluxes in said substantially closed series magnetic circuit including each of said pole pieces but excluding said gap, second winding means more remote from said gap than said first winding means and linking said magnetic circuits in the same effective direction with respect to said gap, and means for supplying an exciting current to the first winding means and a signal current to the second winding means simultaneously for producing circulating fluxes in said pair of magnetic circuits in series and for simultaneously producing a magnetic signal flux in said pair of magnetic circuits in parallel and for producing a signal field at said gap in accordance with a signal to be recorded on said record medium, wherein the improvement comprises means comprising said first winding means for exerting first and second alternating polarity magnetomotive forces on said substantially closed series magnetic circuit with said first and second alternating polarity magnetomotive forces being out of phase and having cooperating waveforms to cyclically switch said substantially closed series magnetic circuit between a saturated and a desaturated condition.

8. A magnetic transducer head comprising a pair of pole portions of magnetic material defining therebetween a gap for coupling to a magnetic record medium, a pair of magnetic circuits connected in parallel to each of said pole portions and extending in substantially the same direction from each of said pole portions in spaced generally parallel relation and defining a substantially closed series magnetic circuit including each of said pole portions adjacent said gap but excluding said gap, means for establishing circulating fluxes in said substantially closed series magnetic circuit and through each of said pole portions adjacent said gap, said magnetic circuits having respective spaced generally parallel legs, and common winding means directly linking both of said legs in the same effective winding direction with respect to said gap, wherein the improvement comprises means comprising said establishing means for exerting first and second alternating polarity magnetomotive forces on said substantially closed series magnetic circuit which are out of phase and of cooperating waveform to cyclically switch said substantially closed series magnetic circuit between saturated and desaturated condition.

9. A magnetic transducer device comprising a series of magnetic cores each having a signal flux path including coupling means for coupling the signal flux path to an external system and each having solid magnetic material extending continuously about a closed loop without any complete interruptions in said magnetic material about said loop to provide a loop magnetic circuit free of non-magnetic gaps, first and second exciting electric circuits directly encircling said magnetic material of said loop magnetic circuit of each of said magnetic cores, first and second sources of electric current connected respectively to said first and second electric circuits of said magnetic cores and supplying respective current waveforms to said first and second electric circuits with at least one of said current waveforms cyclically varying with time and with at least one of said current waveforms producing magnetomotive forces in the respective cores with successively different amplitudes and with said current waveforms from said first and second sources being correlated to switch said cores in sequence to an active transdudcing condition in each cycle, a transducing electric circuit coupled to each of said signal flux paths, and means comprising the sequential switching of said cores for controlling a transducing operation between the transdudcing electric circuit and the respective coupling means of said cores, wherein the improvement comprises said first and second sources of electric current supplying respective first and second alternating polarity current waveforms to said first and second electric circuits to switch said cores in sequence to an active transducing condition in each cycle.

10. A magnetic transducer device comprising a series of magnetic cores, first and second exciting electric circuits encircling each of said cores, first and second sources of electric current connected respectively to said first and second electric circuits of said series of magnetic cores and supplying respective current waveforms to said first and second electric circuits with at least one of said current waveforms cyclically varying with time and with at least one of said current waveforms producing respective magnetomotive forces in the successive cores having successively different amplitudes and with said current waveforms being correlated to switch said cores in sequence to an active transducing condition in each cycle a transducing electric circuit in addition to said first and second exciting electric circuits coupled to each of said magnetic cores, and means comprising the sequential switching of said cores for controlling a transducing operation with respect to said transducing electric circuit, said first and second electric circuits of each magnetic core being in close proximity to produce substantially complete cancellations of the magnetic fields produced thereby during switching of the cores, wherein the improvement comprises said first and second sources of electric current supplying respective first and second alternating polarity current waveforms to said first and second electric circuits to switch said cores in sequence to an active transducing condition in each cycle.

11. A magnetic transducer deviate comprising a series of magnetic cores, a graded electrical winding having successively different numbers of turns coupled to the respective cores of said series, an exciting electric circuit coupled to each of said cores, first and second sources of electric current connected respectively to said graded winding and said exciting electric circuit and supplying respective current waveforms thereto with said current waveforms being of cooperating configuration to switch said cores in sequence to an active transducing condition, transducing electric circuit means coupled to each of said cores, and means comprising the sequential switching of said cores for carrying out a transducing operation with respect to said transducing electric circuit means, wherein the improvement comprises said first and second sources of electric current supplying respective first and second current waveforms of alternating polarity for switching said cores in sequence to an active transducing condition.

12. A magnetic transducer device comprising a plurality of groups of magnetic cores, respective common exciting electric circuits coupled to the magnetic cores of the respective groups with each common exciting electric circuit being coupled in common to all of the cores of one of said groups to produce an identical magnetomotive force waveform in each magnetic core of said group, means comprising electric current source means connected to said common exciting electric circuits for producing first and second magnetomotive force waveforms as a function of time in each of the cores of said groups of cooperating configuration to sequentially switch the cores of each group in succession to an active transducing condition, transducing electric circuit means coupled to said magnetic cores, and means comprising the sequential switching of the cores of the successive groups for carrying out a transducing operation with respect to said transducing electric circuit means, wherein the improvement comprises said means comprising said electric current source means producing first and second magnetomotive force waveforms of alternating polarity as a function of time in each of the cores of said groups to sequentially switch the cores of each group in succession to an active transducing condition.

13. A magnetic transducer device comprising a series of magnetic cores each comprising magnetic material providing a loop magnetic circuit with the circuits successively laterally offset and having respective pairs of legs in lateral alignment, electrically conductive ribbon winding means encircling the legs of the magnetic circuits with successively different numbers of turns, exciting electric circuit means coupled to said legs of each core, means comprising electric current source means connected to said ribbon winding means and to said exciting electric circuit means for producing first and second magnetomotive force waveforms in each leg of each core of cooperating configuration to switch the pair of legs of each core in succession to an active transducing condition, transducing electric circuit means coupled to each of said cores, and means comprising said loop magnetic circuits of said cores for controlling a transducing operation with respect to said transducing electric circuit means, wherein the improvement comprises said means comprising said electric current source means producing first and second magnetomotive force waveforms of alternating polarity in each leg of each core to switch the pair of legs of each core in succession to an active transducing condition.

14. A magnetic transducer device comprising a series of magnetic cores each comprising magnetic material providing a loop magnetic circuit with the circuits successively laterally offset and having respective pairs of legs in lateral alignment, shielding members of electrically conductive non-magnetic material interposed between the successive cores and comprising leg members in lateral alignment with the legs of said loop magnetic circuits, electrically conductive ribbon winding means encircling the legs of the magnetic circuits with successively different numbers of turns, exciting electric circuit means coupled to said legs of each of said cores, means comprising electric current source means connected to said ribbon winding means and to said exciting electric circuit means, for producing first and second magnetomotive force waveforms in each leg of the each core of cooperating configuration to switch the pair of legs of each core in succession to an active transducing condition, transducing electric circuit means coupled to each of said cores, and means comprising said loop magnetic circuits of said cores for controlling a transducing operation with respect to said transducing electric circuit means, wherein the improvement comprises said means comprising said electric current source means supplying out of phase alternating polarity waveforms of nonsinusoidal configuration to said ribbon winding means and to said exciting electric circuit means to switch the pair of each core in succession to an active transducing condition.

15. A magnetic transducer device comprising a plurality of transducer head units for coupling to respective separate channels of a magnetic record medium, signal winding means coupled to each of said transducer head units for signal flux interlinkage with the respective corresponding channels of the record medium, means tending to produce an undesired flux interlinkage between at least a first of said head units and said second medium while another of said head units has a desired flux interlinkage with its associated channel of the record medium, compensating winding means coupled to each of said transducer head units, signal current electric circuit means connecting said signal winding means and said compensating winding means of said head units in an opposing sense such that said compensating winding means tends to reduce the effect of said undesired flux interlinkage between said record medium and said first of said head units during said desired flux interlinkage of said another of said head units during said desired flux interlinkage of said another of said head units with said record medium, and means for substantially limiting the relative effectiveness of said compensating winding means in opposing the effect of desired flux interlinkage between the record medium and the signal winding means as compared to its effectiveness in opposing the effect of said undesired flux interlinkage, wherein the improvement comprises said substantially limiting means comprising means for exerting first and second alternating polarity magnetomotive forces on each of said transducer head units to cyclically desaturate the portions of the respective head units to which said compensating winding means are coupled.

16. A magnetic recording head comprising a series of laterally offset magnetic head units each comprising a magnetic core having a pair of magnetic pole portions defining therebetween a non-magnetic gap, a magnetic tape record medium having a longitudinal dimension extending across said magnetic head units with the gaps of the head units adjacent and in coupling relation to respective laterally offset channels of the record medium, means for moving said magnetic tape record medium in the direction of said longitudinal dimension thereof to move the respective channels of the record medium across the respective head units while maintaining the channels of the record medium in coupling relation to the respective head units at said non-magnetic gaps thereof, the magnetic core of each head unit having a loop recording flux path extending through the pole portions thereof and through the magnetizable material of the associated channel of said record medium, at least one pole portion of each magnetic core having a continuous ferromagnetic circuit providing two legs in parallel with respect to said loop recording flux path, a recording winding coupled to said loop recording flux path of each core, a recording current source for supplying electric current to said recording winding for producing a magnetic recording flux in the loop recording flux path of each head unit which recording flux extends through the two legs of each head unit in parallel and which recording flux is effective to produce a recording on the corresponding channel of the record medium during an active condition of the head unit, first and second series of control windings encircling each leg of each head unit with at least said first series of control windings linking the legs of the successive head units with successively different number of turns, and first and second scanning control sources for supplying first and second control currents to said first and second series of control windings respectively of waveform to produce first and second control magnetomotive force waveforms in the continuous ferromagnetic circuits of the respective head units which first and second control magnetomotive force waveforms combine to provide net cyclically varying control magnetomotive force waveforms in the legs of the respective head units which net control magnetomotive force waveforms are of amplitude values during a major portion of each cycle corresponding to a magnetically saturated condition of the legs but which net control magnetomotive force waveforms in the legs of the respective head units sequentially pass through a zero amplitude value to sequentially place the head units in the active condition, wherein the improvement comprises said first and second scanning control sources supplying first and second control currents of alternating polarity and of different phase to provide net cyclically varying control magnetomotive force waveforms in the legs of the respective head units to sequentially place the head units in the active condition.

17. A magnetic recording head comprising a magnetic head unit comprising a magnetic core having a pair of spaced magnetic pole portions defining therebetween a non-magnetic gap, a magnetic tape record medium having a longitudinal dimension extending across said magnetic head unit with the gap of the head unit adjacent and in coupling relation to the record medium, means for moving said magnetic tape record medium in the direction of said longitudinal dimension thereof to move the record medium across the pole portions while maintaining the record medium in coupling relation to the gap of the head unit, said magnetic core having a loop recording flux path extending through said pole portions thereof and through the magnetizable material of the record medium, at least one pole portion having a continuous ferromagnetic circuit having two legs in parallel with respect to said loop recording flux path, a recording winding coupled to said loop recording flux path of said core, a recording current source for supplying electric current to said recording winding for producing magnetic recording flux in the loop recording flux path, control windings encircling each leg of said core for producing control magnetomotive forces in the respective legs which are in aiding relation with respect to said continuous ferromagnetic circuit but which are substantially equal and opposite with respect to said recording flux path, and a control source for supplying control current to said control windings on the respective legs to produce a control flux in said continuous ferromagnetic circuit for controlling the magnetic condition of said circuit, wherein the improvement comprises means comprising said control source of exerting first and second out of phase alternating polarity magnetomotive forces on said continuous ferromagnetic circuit for cyclically saturating and desaturating said circuit.

18. A magnetic head comprising a magnetic core having a pair of magnetic pole portions defining a non-magnetic gap for coupling to a magnetic record medium, said magnetic core having a loop magnetic flux path extending through said pole portions and through the non-magnetic gap in series for providing magnetic flux interlinkage between the record medium and the magnetic core, at least one pole portion of said magnetic core having a continuous ferromagnetic circuit including two legs in parallel with respect to said loop magnetic flux path, a transducing winding coupled to said loop magnetic flux path and providing for transducing between a magnetic flux variation in said loop magnetic flux path and an electric current variation in said transducing winding, first and second control windings encircling each leg of said core, and first and second scanning control sources for supplying first and second control currents to said first and second control windings respectively to produce first control magnetomotive force waveforms in the respective legs and second control magnetomotive force waveforms in the respective legs which are respectively in aiding relation with respect to said continuous ferromagnetic circuit but substantially cancel at said gap and with said first and second control magnetomotive force waveforms combining to provide a net cyclically varying control magnetomotive force waveform in the continuous ferromagnetic circuit which net control magnetomotive force waveform is of an amplitude corresponding to a magnetically saturated condition of said legs during a major portion of each cycle of operation but passes through a zero amplitude value in each successive cycle of operation to place said core in transducing condition wherein the improvement comprises said first and second scanning control sources supplying first and second control currents of alternating polarity and different phase to said first and second control windings to place said core in transducing condition in each successive cycle of operation.

19. A magnetic playback head comprising a series of laterally offset magnetic head units each comprising a magnetic core having a pair of magnetic pole portions defining therebetween a non-magnetic gap, a magnetic record medium having a longitudinal dimension extending across said magnetic head units with the gaps of the head units adjacent and in coupling relation to respective laterally offset channels of the record medium, means for moving said magnetic record medium in the direction of said longitudinal dimension thereof to move the respective channels of the record medium across the respective head units, the magnetic core of each head unit providing a loop signal flux path for signal flux path for signal flux from the associated channel of the record medium which signal flux path extends through said pole portions of said core, at least one pole portion of each magnetic core having a continuous ferromagnetic circuit including two legs in parallel with respect to said loop signal flux path, a playback element coupled to said loop signal flux path of each head unit for producing an electric output signal in accordance with the signal flux variation at said element, first and second series of control windings encircling each leg of each head unit and each series having numbers of turns on the two legs of each head unit to provide balanced and opposed control magnetomotive forces with respect to the associated playback element but at least said first series of control windings linking the legs of the successive head units with successively different numbers of turns, and first and second scanning control sources for supplying first and second control currents to said first and second series of control windings respectively of waveform to produce said first and second control magnetomotive force waveforms in the continuous ferromagnetic circuits of the head units which first and second control magnetomotive force waveforms combine to provide net cyclically varying control magnetomotive force waveforms of amplitude values during a major portion of each cycle corresponding to a magnetically saturated condition of the legs but which net control magnetomotive force waveforms pass through a zero amplitude value to successively couple signal flux from the respective channels of the record medium to said playback elements of the respective head units, wherein the improvement comprises said first and second scanning control sources supplying first and second control currents for alternating polarity and of different phase to successively couple signal flux from the respective channels of the record medium to said playback elements of the respective head units.

20. A magnetic recording head assembly comprising a series of head units having non-magnetic gaps for coupling to respective channels of a magnetic record medium, means extending in overlying relation to said non-magnetic gaps for producing a magnetic signal field in the region of said gaps below the threshold value where the field will be effectively recorded on said record medium, recording bias means coupled to said head units for supplying a bias magnetic field at said gaps of effective strength to cause the signal field to be effectively recorded on the record medium, means comprising a saturable portion of each head unit for effectively maintaining said recording bias field below said effective strength, and means for desaturating said saturable portion of each of said head units to effect recording of said signal field on the record medium at the corresponding non-magnetic gap, wherein the improvement comprises means comprising said desaturating means for exerting out of phase alternating polarity magnetomotive forces on said saturable portion to cyclically desaturate said saturable portion of each of said head units in sequence.

21. A magnetic transducer head for a magnetic record medium comprising a series of head units having respective magnetic cores with non-magnetic gaps for coupling with the record medium, signal translating means in coupling relation with said gaps for signal flux interlinkage therewith to translate between a signal current therein and a signal magnetization of the portion of the record medium at said gap, means comprising saturable portions of said cores for blocking signal flux interlinkage between said signal translating means and the respective non-magnetic gaps, means for producing first and second magnetomotive forces in each of said cores of alternating polarity with at least the first of the magnetomotive forces having respective different amplitudes in the saturable portions of the respective cores, said magnetomotive forces being of respective amplitudes and waveforms in the respective saturable portions of said cores to sequentially desaturate said saturable portions to scan said record medium, wherein the improvement comprises said producing means producing first magnetomotive forces in each of said cores of generally rectangular waveform and producing second magnetomotive forces in each of said cores of generally triangular alternating polarity waveform.

22. A transducer system comprising a plurality of magnetic cores arranged in stacked relationship, a plurality of input windings coupled to each of said cores, input circuit means for connecting the respective input windings of each core means to different phases of an input alternating current source, means comprising the number of turns and polarity of the windings connected to the respective phases of the alternating current source for producing a plurality of alternating current magnetomotive force components in each of said magnetic core means to provide respective resultant alternating current magnetomotive forces in the respective core means of successively different phase, an output winding linking said magnetic cores for producing an electrical output in accordance with the magnetic flux variation in said magnetic cores, at least one of said windings comprising a single conductor linking a plurality of said cores in common with at least one turn thereof, and said conductor linking successive cores with successively higher integral numbers of turns.

23. A transducing system comprising a series of magnetic cores, a plurality of input windings coupled to each of said cores to provide at least a first set of input windings coupled to the respective cores of the series and a second set of input windings coupled to the respective cores of the series, means comprising said first and second sets of input windings respectively for exerting first and second alternating polarity magnetomotive forces on each of said cores, the amplitudes of one of the first and second alternating polarity magnetomotive forces acting on the respective cores being linearly graded.

24. A transducing system comprising a series of magnetic cores, a plurality of input windings coupled to each of said cores to provide at least a first set of input windings coupled to the respective cores of the series and a second set of input windings coupled to the respective cores of the series, means comprising said first and second sets of input windings for exerting first and second alternating polarity magnetomotive forces on each of said cores, the first and second magnetomotive forces acting on each of the cores having a phase angle therebetween substantially greater than 90 degrees.

25. A transducing system comprising a series of magnetic cores, a plurality of input windings coupled to each of said cores to provide at least a first set of input windings coupled to the respective cores of the series and a second set of input windings coupled to the respective cores of the series, means comprising said first and second sets of input windings respectively for exerting first and second alternating polarity magnetomotive forces on each of said cores, the amplitudes of the first and second magnetomotive forces acting on the respective cores both being linearly graded.

26. A transducing system comprising a series of magnetic cores, a plurality of input windings coupled to each of said cores to provide at least a first set of input windings coupled to the respective cores of the series and a second set of input windings coupled to the respective cores of the series, means comprising said first and second sets of input windings respectively for exerting first and second alternating polarity magnetomotive forces on each of said cores, the first alternating polarity magnetomotive force having a generally rectangular waveform and the second alternating polarity magnetomotive force having a generally triangular shaped waveform.

27. The system of claim 26 with the first set of input windings linking the successive cores with substantially the same number of turns, the second set of input windings linking the successive magnetic cores with successively greater numbers of turns, and the waveforms of the first and second alternating polarity magnetomotive forces being such as to provide substantially uniform intervals between switching of the successive cores.

28. The transducing system of claim 23 with an output winding linking said magnetic cores for producing an electric output in accordance with the magnetic flux variation in said magnetic cores.

29. The system of claim 24 with an output winding linking said magnetic cores for producing an electric output in accordance with the magnetic flux variation in said magnetic cores.

30. The system of claim 25 with an output winding linking said magnetic cores for producing an electric output in accordance with the magnetic flux variation in said magnetic cores.

31. The system of claim 26 with an output winding linking said magnetic cores for producing an electric output in accordance with the magnetic flux variation in said magnetic cores.

32. The system of claim 27 with an output winding linking said magnetic cores for producing an electric output in accordance with the magnetic flux variation in said magnetic cores.

33. The system of claim 23 with said series comprising a number of cores of at least about 360.

References Cited

UNITED STATES PATENTS

| | | | |
|---|---|---|---|
| 2,743,320 | 4/1956 | Daniels | 179—100.2 |
| 2,785,233 | 3/1957 | Stuart | 179—100.2 |
| 2,807,676 | 9/1957 | Lynn | 179—100.2 |
| 2,913,596 | 11/1959 | Ogle | 307—88 |

BERNARD KONICK, Primary Examiner

L. R. GOUDEAU, Assistant Examiner

U.S. Cl. X.R.

307—88; 340—174, 174.1